US012786545B2

(12) United States Patent
Mathur et al.

(10) Patent No.: US 12,786,545 B2
(45) Date of Patent: Nov. 3, 2026

(54) SYSTEMS AND METHODS FOR ADJUSTING CAMERA CONFIGURATIONS IN A USER DEVICE

(71) Applicant: SAMSUNG ELECTRONICS CO., LTD., Suwon-si (KR)

(72) Inventors: Kapil Raj Mathur, Noida (IN); Sawan Dineshbhai Kaulic, Noida (IN); Anubhav Sachan, Noida (IN); Harvind Singh, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 18/377,600

(22) Filed: Oct. 6, 2023

(65) Prior Publication Data

US 2024/0205531 A1 Jun. 20, 2024

Related U.S. Application Data

(63) Continuation of application No. PCT/KR2023/014527, filed on Sep. 22, 2023.

(30) Foreign Application Priority Data

Dec. 15, 2022 (IN) ............................ 202211072703

(51) Int. Cl.
*H04N 23/61* (2023.01)
*G06T 7/80* (2017.01)
(Continued)

(52) U.S. Cl.
CPC ............... *H04N 23/61* (2023.01); *G06T 7/80* (2017.01); *H04N 23/632* (2023.01); *H04N 23/665* (2023.01)

(58) Field of Classification Search
CPC .... H04N 23/61; H04N 23/632; H04N 23/665; H04N 23/617; H04N 23/64;
(Continued)

(56) References Cited

U.S. PATENT DOCUMENTS 7,805,066 B2 9/2010 Wexler et al.
9,477,908 B2 * 10/2016 Sigal ...................... G06F 18/23
(Continued)

FOREIGN PATENT DOCUMENTS

CN 104935810 A 9/2015
CN 109359564 A 2/2019
(Continued)

OTHER PUBLICATIONS

International Search Report and Written Opinion issued Dec. 28, 2023 by the International Searching Authority in International Patent Application No. PCT/KR2023/014527. (PCT/ISA/210 and PCT/ISA/237).
(Continued)

*Primary Examiner* — Michael E Teitelbaum
(74) *Attorney, Agent, or Firm* — Sughrue Mion, PLLC

(57) ABSTRACT

Provided are a system, an electronic device, and a method for adjusting camera configurations including rendering an image of a scene to be obtained by a camera of the electronic device, identifying relevant bounding boxes associated with the image, each relevant bounding box comprising a corresponding object. The corresponding object of each relevant bounding box includes a co-occurrence value. The method includes generating a set of reference parameters associated with the corresponding objects of the relevant bounding boxes by identifying a reference parameter for the corresponding object of each relevant bounding box of the relevant bounding boxes, identifying one or more reference images and retrieving corresponding reference configura-
(Continued)

tions associated with the identified one or more reference images based on the set of reference parameters; and configuring the camera of the user device based on the reference configurations of at least one of one or more reference images.

20 Claims, 10 Drawing Sheets

(51) Int. Cl.
*H04N 23/60* (2023.01)
*H04N 23/63* (2023.01)

(58) Field of Classification Search
CPC .... H04N 23/633; H04N 23/72; H04N 23/631; G06T 7/80; H04M 2250/52; G06N 3/045
See application file for complete search history.

(56) References Cited

U.S. PATENT DOCUMENTS

| | | | | |
|---|---|---|---|---|
| 11,076,087 | B2 | 7/2021 | Kim et al. | |
| 11,699,213 | B2 | 7/2023 | Ban et al. | |
| 2008/0075361 | A1 * | 3/2008 | Winn | G06V 10/44 382/190 |
| 2011/0293259 | A1 | 12/2011 | Doepke et al. | |
| 2012/0002094 | A1 | 1/2012 | Jelicz | |
| 2012/0087592 | A1 | 4/2012 | Kim et al. | |
| 2016/0269706 | A1 * | 9/2016 | Li | H04N 9/643 |
| 2019/0213752 | A1 | 7/2019 | Adato et al. | |
| 2020/0053293 | A1 | 2/2020 | Lee et al. | |
| 2021/0158108 | A1 | 5/2021 | Ando | |
| 2021/0192692 | A1 | 6/2021 | Takatsuka et al. | |
| 2022/0159177 | A1 | 5/2022 | Oshima | |

FOREIGN PATENT DOCUMENTS

| | | | |
|---|---|---|---|
| CN | 108540722 | B | 8/2020 |
| CN | 113395456 | A | 9/2021 |
| JP | 2001-224014 | A | 8/2001 |
| JP | 2003-333498 | A | 11/2003 |
| KR | 10-2012-0002834 | A | 1/2012 |
| KR | 10-2016-0093293 | A | 8/2016 |
| KR | 10-2020-0001111 | A | 1/2020 |
| KR | 10-2139524 | B1 | 7/2020 |
| KR | 10-2661983 | B1 | 5/2024 |
| WO | 2016/058468 | A1 | 4/2016 |

OTHER PUBLICATIONS

Communication issued on Oct. 22, 2025 by the Intellectual Property India in Indian Patent Application No. 202211072703.

* cited by examiner

SYSTEMS AND METHODS FOR ADJUSTING CAMERA CONFIGURATIONS IN A USER DEVICE

CROSS-REFERENCE TO RELATED APPLICATION(S)

This application is a by-pass continuation application of International Application No. PCT/KR2023/014527, filed on Sep. 22, 2023, which is based on and claims priority to Indian Patent Application No. 202211072703, filed on Dec. 15, 2022, in the Indian Patent Office, the disclosures of which are incorporated by reference herein their entireties.

BACKGROUND

1. Field

The disclosure relates to image capturing, and more particularly relates to systems and methods for adjusting camera configurations in a user device.

2. Description of Related Art

Due to advancements in image capturing technologies, users are provided with multiple options related to image capturing with devices, such as phones and tablets. For instance, image editing options may be provided to the users that enable the users to modify one or more characteristics of the image after capturing images. Further, multiple settings may be provided on the devices which enable users to pre-set desired characteristics for images to be captured. Each of these settings often require manual adjustments prior to capturing of the images.

Users that casually capture images may be unaware of the various settings that are related to images and what role each setting plays while capturing the images. For instance, users may not be aware how adjusting one or more settings affects the final image that will be captured. In some cases, adjustment of settings prior to capturing images appear complicated to users, and hence, users are reluctant to utilize the various available adjustable settings.

In some cases, users opt for automatic adjustment of settings which may be done by the device based on sensed parameters related to a scene that is to be captured as an image. However, automatic adjustment of settings does not always provide better image captures. As an example, during automatic adjustment, the device may focus on a specific bright area of the scene and may adjust the setting to reduce exposure of the entire image. Thus, images captured by automatic adjustment of settings may suffer from drawbacks such as under-exposure, over-exposure, dullness, etc. The result is that users are unable to capture high-quality images, such as images resembling professionally captured images, even with assistance from automatic adjustments.

SUMMARY

According to an aspect of the disclosure, provided is a method for adjusting camera configurations in an electronic device. The method may include rendering an image of a scene to be obtained by a camera of the electronic device. The method may further include identifying relevant bounding boxes associated with the image, each relevant bounding box including a corresponding object, the corresponding object of each relevant bounding box including a co-occurrence value. The method may further include generating a set of reference parameters associated with the corresponding objects of the relevant bounding boxes by identifying a reference parameter for the corresponding object of each relevant bounding box of the relevant bounding boxes. The method may further include identifying one or more reference images. The method may further include retrieving corresponding reference configurations associated with the identified one or more reference images based on the set of reference parameters. The method may further include configuring the camera of the electronic device based on the reference configurations of at least one of one or more reference images.

According to an aspect of the disclosure, an electronic device for adjusting camera configurations includes at least one memory and at least one processor communicatively coupled to the at least one memory. The at least one processor may be configured to render an image of a scene to be captured by a camera of the user device. The at least one processor may be further configured to identify relevant bounding boxes associated with the image, each relevant bounding box may include a corresponding object, the corresponding object of each relevant bounding box may include a co-occurrence value. The at least one processor may be further configured to generate a set of reference parameters associated with the corresponding objects of the relevant bounding boxes by identifying a reference parameter for the corresponding object of each relevant bounding box of the relevant bounding boxes. The at least one processor may be further configured to identify one or more reference images and retrieving corresponding reference configurations associated with the identified one or more reference images based on the set of reference parameters. The at least one processor may be further configured to configure the camera based on the reference configurations of at least one of one or more reference images.

According to an aspect of the disclosure, an electronic device for adjusting camera configurations includes at least one memory and at least one processor may be configured to identify relevant bounding boxes associated with an image, each relevant bounding box comprising a corresponding object, the corresponding object of each relevant bounding box comprising a co-occurrence value. The at least one processor may be configured to generate a set of reference parameters associated with the corresponding objects of the relevant bounding boxes by identifying a reference parameter for the corresponding object of each relevant bounding box of the relevant bounding boxes. The at least one processor may be configured to identify one or more reference images and retrieving corresponding reference configurations associated with the identified one or more reference images based on the set of reference parameters. The at least one processor may be configured to configure the camera based on the reference configurations of one or more reference images.

According to an aspect of the disclosure, provided is a computer-readable recording medium having recorded thereon a program which, when executed by a computer, causes the computer to perform the method for adjusting camera configurations in an electronic device. The method may comprises rendering an image of a scene to be obtained by a camera of the electronic device. The method may further comprises identifying relevant bounding boxes associated with the image, each relevant bounding box comprising a corresponding object, the corresponding object of each relevant bounding box comprising a co-occurrence value. The method may further comprises generating a set of reference parameters associated with the corresponding objects of the relevant bounding boxes by identifying a reference parameter for the corresponding object of each relevant bounding box of the relevant bounding boxes. The method may further comprises identifying one or more reference images and retrieving corresponding reference configurations associated with the identified one or more reference images based on the set of reference parameters. The method may further comprises configuring the camera of the electronic device based on the reference configurations of at least one of one or more reference images.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

It should be understood by those skilled in the art that the foregoing general description and the following detailed description are explanatory and are not intended to be limiting.

The terms "comprise", "comprising", "include", "including", or any other variations thereof are intended to cover a non-exclusive inclusion, such that a process or method that comprises a list of steps and/or operations does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Throughout the disclosure, the expression "at least one of a, b or c" indicates only a, only b, only c, both a and b, both a and c, both b and c, or all of a, b, and c.

The terms "multi-party conversation", "human-to-human conversation", and "conversation" may be used interchangeably throughout the description. The terms "user device", "device", and "electronic device" along with their inherent variations may be used interchangeably throughout the description.

There is a need for an electronic device and a method that efficiently adjust camera configurations based on certain features of an image to be captured. Further, there is a need for an electronic device and a method that enable a user to easily adjust camera configurations based on one or more recommended images.

Provided below are a method and an electronic device for adjusting camera configurations based on providing recommendations of reference images to a user associated with the electronic device.

Provided below are a method and a system for adjusting camera configurations in an electronic device based on providing recommendations of reference images to a user associated with the electronic device.

Figure 1A:
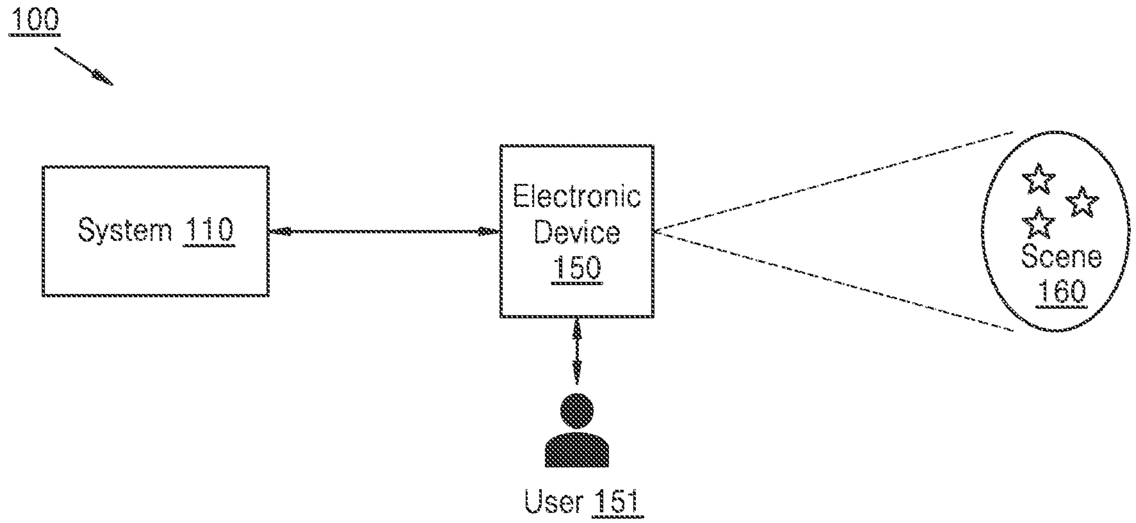
FIG. 1A illustrates an example environment of a system for adjusting camera configurations in a user device, according to an embodiment of the disclosure.

FIG. 1A illustrates an example overview of an environment 100 comprising a system 110, an electronic device (or a user device) 150 associated with a user 151, and a scene 160 intended to be obtained by the user 151 by means of the electronic device 150, according to an embodiment of the disclosure. The scene 160 may refer to any real-life view that the user 151 is viewing and intends to capture and/or obtain and store the real-life view in the form of images. In an embodiment, the scene 160 may include one or more objects, such as, but not limited to, humans, birds, furniture, artistic pieces, and/or trees.

As depicted, the system 110 may be in communication with the electronic device 150. The electronic device 150 may be configured to allow the user 151 to preview an image of the scene 160, and further, obtain (or capture) the image in response to a user input. The electronic device 150 associated with the user 151 may include, but not limited to, a smartphone, a tablet, a laptop, a personal computer, a smart watch, a smart television, an IoT device, a professional camera (e.g., a digital single-lens reflex (DSLR) camera), and any other electronic device including a camera configured to facilitate the user 151, directly or indirectly, to capture an image of the scene 160. The electronic device 150 may be referred to as a user device or a mobile device associated with the user 151.

The system 110 may render the image of the scene 160 from the electronic device 150, process the rendered image to determine similar images to be recommended, and cause the electronic device 150 to obtain (or capture) the image based on the recommended images. In an embodiment, the system 110 may be a standalone entity located at a remote location and connected to the electronic device 150 via any suitable network. For example, the system 110 may be implemented on a physical server or in a cloud-based architecture and communicably coupled to the electronic device 150. In an embodiment, the system 110 may be integrated within the electronic device 150. In an embodiment, the system 110 may be implemented in a distributed manner, in that, one or more components of the system 110 may be implemented within the electronic device 150, while one or more components of the system 110 may be implemented within a cloud-based server or a physical server. Accordingly, the electronic device 150 may render the image of the scene 160 obtained by the camera of the electronic device 150, process the rendered image to determine similar images to be recommended, and cause the electronic device 150 to obtain (or capture) the image based on the recommended images.

The system 110 may be configured to control the electronic device 150 to enable automated adjustments of camera configurations such that users unaware of available camera configurations are able to capture high-quality images. Further, the system 110 may provide certain recommended images to the electronic device 150 so that the user 151 may view the certain recommended images, such as high-quality professional images, which relate to a scene that the users intend to capture. The electronic device 150 may select any recommended image based on a user input. The electronic device 150 may adopt the configurations of the recommended image to capture the present images. Thus, based on the configurations of the recommended image, capturing of enhanced images with good composition, such as ISO, aperture, color, focus, temperature, shutter speed, exposure, focus, white balance, and the like, is facilitated.

The electronic device 150 may be configured to enable automated adjustments of camera configurations such that users unaware of available camera configurations are able to capture high-quality images. Further, the electronic device 150 may provide certain recommended images to the user 151 so that the user 151 may view certain recommended images, such as high-quality professional images, which relate to a scene that the user 151 intends to capture. The user 151 may select any recommended image based on the certain recommended images using the electronic device 150. The electronic device 150 may adopt the configurations of the recommended image to capture the present images. Accordingly, the electronic device 150, based on the configurations of the recommended image, may facilitate to capture (or obtain) enhanced images with good composition, such as ISO, aperture, color, focus, temperature, shutter speed, exposure, focus, white balance, and the like.

The system 110 may be configured to achieve the above-mentioned technical advantages by performing one or more operations explained in detail at least with reference to FIGS. 2 to 4D. The electronic device 150 may be configured to achieve the above-mentioned technical advantages by performing one or more operations explained in detail at least with reference to FIGS. 2 to 5.

Figure 1B:
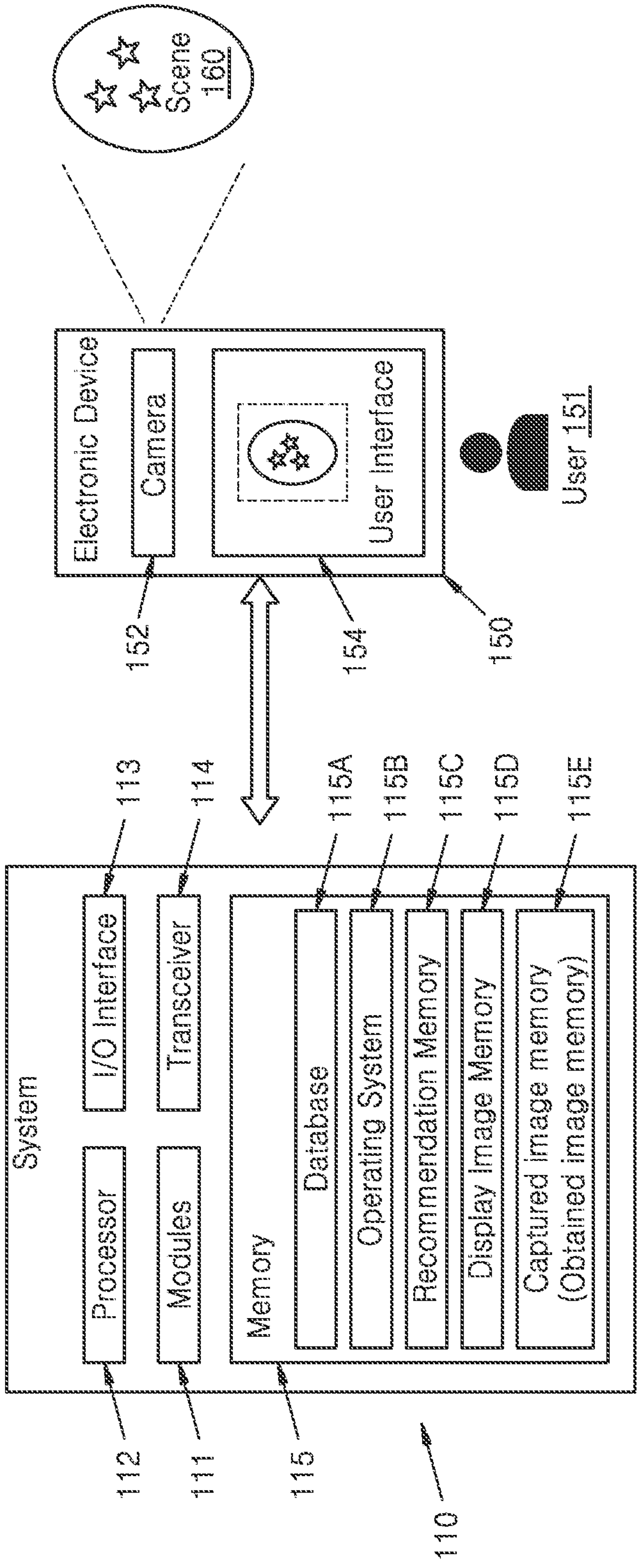
FIG. 1B illustrates a schematic block diagram of the system and the user device for adjusting camera configurations, according to an embodiment of the disclosure.

Reference is made to FIG. 1B which illustrates a schematic block diagram of the system 110 and the electronic device 150, according to an embodiment of the disclosure.

As depicted, the electronic device 150 may comprise a camera 152 and a user interface 154. The camera 152 may include at least one camera to capture the scene 160 as an image. As may be understood, although an embodiment is directed towards capturing images, the camera 152 may be used for capturing videos as well and configurations for capturing videos may be similarly applied, as discussed throughout this disclosure. The camera 152 may be configured to enable the user 151 to view the scene 160 visible in a viewfinder 155 of the electronic device 150. In an embodiment, the camera 152 may be associated with a camera application within the electronic device 150. That is, the camera 152 may render a first image of the scene 160 on the user interface 154, allowing the user 151 to view the first image of the scene 160. The camera 152 may further be configured to capture the rendered first image as a second image in response to a user input. The user input may be a non-limiting implementation of a shutter button through physical keys or through soft keys available on the display of the camera 152. The second image may be stored on a memory of the camera 152 or a memory 153 of the electronic device 150. The camera 152 may further be associated with one or more adjustable configurations that allows the camera 152 to capture the rendered first image with different configurations. Some non-limiting examples of configurations associated with the camera 152 include ISO, aperture, color, focus, temperature, shutter speed, exposure, focus, white balance, and the like. A particular set of such example configurations of the camera 152 while capturing (or obtaining) an image defines the corresponding configurations of the captured image (or obtained image).

The system 110 may be configured to render and process an image to be captured by the camera 152 of the electronic device 150. The system 110 may include one or more modules 111, a processor (or controller) 112, an Input/Output (I/O) interface 113, a transceiver 114, and a memory 115. Further, even though only one electronic device 150 is depicted in FIG. 1B, in an embodiment where the system 110 is implemented as a standalone entity at a server/cloud architecture, the system 110 may be in communication with multiple electronic devices to render image(s) indicative of scene(s) to be captured from each of the multiple electronic devices, and the details provided below with respect to the system 110 and the electronic device 150 is applicable for the system 110 and the multiple electronic devices as well.

In an embodiment, the processor 112 may be operatively coupled to each of the I/O interface 113, the one or more modules 111, the transceiver 114, and the memory 115. In an embodiment, the processor 112 may include at least one processor (or data processor) for executing processes in Virtual Storage Area Network. The processor 112 may include specialized processing units such as, integrated system (bus) controllers, memory management control units, floating point units, graphics processing units, digital signal processing units, etc. In an embodiment, the processor 112 may include a central processing unit (CPU), a graphics processing unit (GPU), or both. The processor 112 may be one or more general processors, digital signal processors, application-specific integrated circuits, field-programmable gate arrays, servers, networks, digital circuits, analog circuits, combinations thereof, or other now known or later developed devices for analyzing and processing data. The processor 112 may execute a software program, such as code to perform the operation.

The processor 112 may be in communication with one or more input/output (I/O) devices via the I/O interface 113. In an embodiments, the processor 112 may communicate with the electronic device 150 using the I/O interface 113. In an embodiments, the I/O interface 113 may be implemented within the electronic device 150. The I/O interface 113 may employ communication code-division multiple access (CDMA), high-speed packet access (HSPA+), global system for mobile communications (GSM), long-term evolution (LTE), WiMax, or the like, etc.

Using the I/O interface 113, the system 110 may communicate with one or more I/O devices (Input/Output devices), specifically, the electronic device 150 being used to obtain images. For example, the input device may be an antenna, microphone, touch screen, touchpad, storage device, transceiver, video device/source, etc. The output devices may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc.

The processor 112 may be disposed in communication with a communication network via a network interface. In an embodiment, the network interface may be the I/O interface 113. The network interface may connect to the communication network to enable connection of the system 110 with the electronic device 150 and/or outside environment. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface and the communication network, the system 110 may communicate with other devices. The network interface may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

In an embodiment, the memory 115 may be communicatively coupled to the at least one processor 112. The memory 115 may be configured to store data, instructions executable by the at least one processor 112. In an embodiment, the memory 115 may be provided within the electronic device 150. In an embodiment, the memory 115 may be provided within the system 110 being remote from the electronic device 150. In an embodiment, the memory 115 may communicate with the processor 112 via a bus within the system 110. In an embodiment, the memory 115 may be located remote from the processor 112, and may be in communication with the processor 112 via a network. The memory 115 may include, but not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 115 may include a cache or random-access memory for the processor 112. In alternative examples, the memory 115 is separate from the processor 112, such as a cache memory of a processor, the system memory, or other memory. The memory 115 may be an external storage device or database for storing data. The memory 115 may be operable to store instructions executable by the processor 112. The functions, acts or tasks illustrated in the figures or described may be performed by the programmed processor 112 for executing the instructions stored in the memory 115. The functions, acts or tasks are independent of the particular type of instructions set, storage media, processor or processing strategy and may be performed by software, hardware, integrated circuits, firmware, micro-code and the like, operating alone or in combination. Processing strategies may include multiprocessing, multitasking, parallel processing, and the like.

In an embodiment, the one or more modules 111 may be included within the memory 115. The one or more modules 111 may be included in the processor 112. The memory 115 may further include a database 115A to store data. The one or more modules 111 may store a set of instructions that may be executed to cause the system 110, in particular, the processor 112 of the system 110, to perform any one or more of the methods/processes disclosed herein. The one or more modules 111 may be configured to perform the operations of the disclosure using the data stored in the database 115A, to process rendered image and cause modification of camera configurations of the camera 152 of the electronic device 150. For instance, the one or more modules 111 may be configured to perform the operations disclosed in FIGS. 4A-4D. The operations disclosed in FIGS. 4A-4D performed by the one or more modules 111 may be performed by the processor 112. In an embodiment, each of the one or more modules 111 may be a hardware unit which may be outside the memory 115. Further, the memory 115 may include an operating system 115B for performing one or more tasks of the system 110, as performed by a generic operating system. In an embodiment, each of the one or more modules 111 may be included in the electronic device 150 or a processor 157 of the electronic device 150.

The memory 115 may also include a recommendation memory 115C configured to store a plurality of reference images in association with corresponding reference configurations. The corresponding reference configurations associated with the plurality of reference images may relate to configurations of a reference camera used to capture (or obtain) the plurality of reference images. In particular, the reference configurations of each reference image refer to configurations adopted by a reference camera (for example, of the electronic device 150 using which the reference image was captured (or obtained)) at the time of capturing (or obtaining) that particular reference image. In an embodiment, the recommendation memory 115C may comprise pre-stored reference images. In an embodiment, the recommendation memory 115C may be in communication with the internet and reference images may be dynamically stored in the recommendation memory 115C.

The memory 115 may also include a display image memory 115D configured to store image data related to images rendered on the user interface 154 of the electronic device 150, such as, by means of the view finder 155 of the electronic device 150. The memory 115 may also include a captured image memory 115E configured to store images that are captured by the camera 152 of the electronic device 150. In an embodiment, each of the images captured by the camera 152 may be stored in association with corresponding configurations, i.e., configurations of the camera 152 at the time of capturing the images.

The transceiver 114 may be configured to receive and/or transmit signals to and from the electronic device 150. In an embodiment, the database 115A may be configured to store the information as required by the one or more modules 111 and the processor 112 to perform one or more functions for processing images.

In an embodiment, the I/O interface 113 may enable input and output to and from the system 110 using suitable devices such as, but not limited to, display, keyboard, mouse, touch screen, microphone, speaker and so forth.

Further, the disclosure relates to a computer-readable medium that includes instructions or receives and executes instructions responsive to a propagated signal. Further, the instructions may be transmitted or received over the network via a communication port or interface or using a bus. The communication port or interface may be a part of the processor 112 or may be a separate component. The communication port may be created in software or may be a physical connection in hardware. The communication port may be configured to connect with a network, external media, the display, or any other components in system 110, or combinations thereof. The connection with the network may be a physical connection, such as a wired Ethernet connection or may be established wirelessly. The additional connections with other components of the system 110 may be physical or may be established wirelessly. The network may alternatively be directly connected to a bus. The communication port may be included in the transceiver 114.

Figure 2:
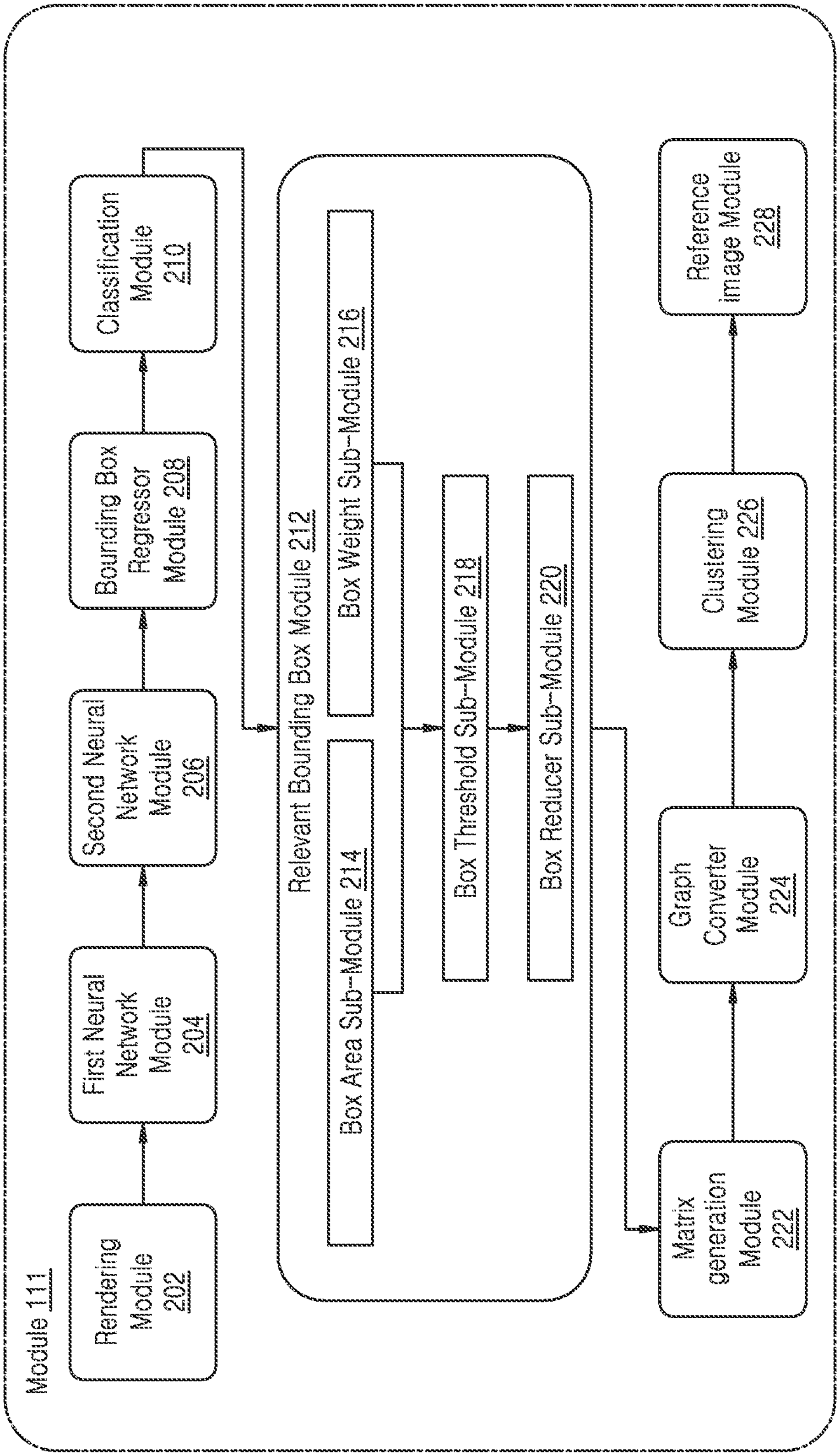
FIG. 2 illustrates a schematic block diagram of modules of the system for adjusting camera configurations in the user device, according to an embodiment of the disclosure.

FIG. 2 illustrates a schematic block diagram of the one or more modules 111 involved in implementing an embodiment of the disclosure. The illustrated embodiment of FIG. 2 also depicts a sequence flow of processes among the one or more modules 111 for processing images rendered on the electronic device 150. The one or more modules 111 may include, but are not limited to, a rendering module 202, a first neural network module 204, a second neural network module 206, a bounding box regressor module 208, a classification module 210, a relevant bounding box module 212, a matrix generation module 222, a graph converter module 224, a clustering module 226, and a reference image module 228. The one or more modules 111 may be implement by way of suitable hardware and/or software applications. The one or more modules 111 may refer to the one or more processes for processing images rendered on the electronic device 150.

The rendering module (or rendering process) 202 may be configured to render an image indicative of a scene 160 to be captured (or obtained) by the camera 152 of the electronic device 150. In an embodiment, the image may be an image being displayed on the view finder 155 of the electronic device 150. That is, the image may be a real-time image of the scene 160, as shown in FIG. 1A. However, the real-time image indicative of the scene 160 is yet to be captured by the camera 152 and is only visible as a tentative view of the image if captured in a current/initial set of configuration settings of the electronic device 150. An embodiment of the disclosure relate to updating such current/initial set of configuration settings to another set of configuration settings in order to enhance the image of the scene, based on one or more recommended images provided by the system 110 to the user.

The rendered image may comprise one or more objects corresponding to one or real-life objects in the scene 160. The rendering module 202 may provide the image to the first neural network module 204 and the first neural network module 204 may be configured to identify one or more features contained in the rendered image. Each of the identified features may be associated with one or more of the objects in the rendered image. In an embodiment, the feature may be a particular part and/or a particular pattern of an object associated with the image. In an embodiment, the first neural network module 204 may comprise one or more classes of artificial neural networks (ANN). In an embodiment, the first neural network module 204 may comprise a Residual Neural Network (ResNet).

The first neural network module 204 may be configured to process the identified one or more features contained in the image and generate a feature map based on the processing of the one or more features. In an embodiment, the first neural network module 204 may comprise filters that slide along inputs, i.e., the identified features, and provides translation equivariant responses, thereby generating the feature map.

The second neural network module 206 may be configured to process the feature map generated by the first neural network module 204. The second neural network module 206 may be configured to determine (or identify) multiple regions of interest associated with the rendered image based on processing of the feature map. In an embodiment, the second neural network module 206 may be a Region Proposal Network (RPN). In an embodiment, the first neural network module 204 and the second neural network module 206 may together comprise a faster recurrent convolutional neural network (faster RCNN). In an embodiment, the first neural network module 204 and the second neural network module 206 may form part of a common module implementing a faster RCNN.

The bounding box regressor module 208 may be configured to process the regions of interest obtained by the second neural network module 206 and generate a plurality of bounding boxes associated with the image. In particular, each of the regions of interest may be encompassed with a corresponding bounding box, hence generating the plurality of bounding boxes. In an embodiment, each of the plurality of bounding boxes is associated with a single corresponding object from the objects associated with the image.

In an embodiment, the second neural network module 206 may be configured to determine (or identify) a confidence value for each of the plurality of bounding boxes. That is, the plurality of bounding boxes may be processed by selecting, either simultaneously or sequentially, a bounding box from the plurality of bounding boxes and determining (or identifying) the corresponding confidence value for each of the selected bounding box. In an embodiment, the second neural network module 206 may determine (or identify) the confidence value for each of the determined regions of interest, and confidence value of a particular region of interest may define the confidence value of the corresponding bounding box of the particular region of interest. As described above, each of the plurality of bounding boxes is associated with a corresponding object. The confidence value of a particular bounding box may indicate a probability value of presence of a predetermined class associated with the corresponding object within the particular bounding box. In an embodiment, the probability value may be an aggregation of a normalized class probability estimated through a classification algorithm and a normalized distance score between the camera 152 of the electronic device 150 and the real-life object in the scene 160 being captured (or obtained).

The classification module 210 may be configured to determine (or identify) a classification value associated with each of the plurality of bounding boxes. The plurality of bounding boxes may be processed by selecting, either simultaneously or sequentially, a bounding box from the plurality of bounding boxes and determining (or identifying) the corresponding classification value for each of the selected bounding box. The classification module 210 may comprise a multiclass classification algorithm based on which the corresponding object within each bounding box may be classified into a number of classes. In other words, the classification module 210 determines (or identifies) which classes does a corresponding object belong to in a specific bounding box, and thus, the classification value of a specific bounding box may be indicative of a number of classes that the specific bounding box (or the object therein) is categorized into. In an embodiment, the classification module 210 may be configured to determine (or identify) a classification value for an object within a specific bounding box based on the confidence value of the specific bounding box. A classification value associated with each of the plurality of bounding boxes may thus be obtained. In an embodiment, the bounding box regressor module 208 and the classification module 210 may operate substantially simultaneously.

In an embodiment, each object within the image may have a co-occurrence value. The co-occurrence value of a particular object may be associated with a frequency of occurrence of that particular object within the respective bounding box. In an embodiment, the co-occurrence value may be associated with a frequency of occurrence of a particular object within the image. In an embodiment, the co-occurrence value may be associated with a frequency of occurrence of object classes across the image.

The relevant bounding box module 212 may be configured to process the plurality of bounding boxes in order to determine (or identify) relevant bounding boxes associated with the image from the plurality of bounding boxes. In an embodiment, the relevant bounding box module 212 may be configured to determine (or identify) the relevant bounding boxes based on respective areas and respective classification values of the plurality of bounding boxes. In an embodiment, the relevant bounding box module 212 may comprise a box area sub-module 214, a box weight sub-module 216, a box threshold sub-module 218, and a box reducer sub-module 220.

The box area sub-module 214 may be configured to determine (or identify) an area of each of the plurality of bounding boxes. In an embodiment, the plurality of bounding boxes may comprise bounding boxes B1, B2, B3, . . . BN having position coordinates (x1, y1), (x2, y2), (x3, y3), . . . (xN, yN). Each of the plurality of bounding boxes may have a corresponding width w1, w2, w3, . . . wN and a corresponding height h1, h2, h3, . . . hN, In an embodiment, to determine (or identify) the area, the box area sub-module 214 may select a particular bounding box, determine (or identify) the area for that particular bounding box, and repeat the process by selecting each of the plurality of bounding boxes. In an embodiments, the box area sub-module 214 may determine (or identify) a corresponding area for each of the plurality of bounding boxes based on a product of the respective heights and widths. For example, the box area sub-module 214 may determine (or identify) area a1 for bounding box B1 as being w1*h1. Similarly, the box area sub-module 214 may determine (or identify) area a2 for bounding box B2 as being w2*h2. Accordingly, the box area sub-module 214 may determine (or identify) area a1, a2, a3, . . . , aN for each of the bounding boxes B1, B2, B3, . . . , BN.

The box weight sub-module 216 may be configured to determine (or identify) a weight to each of the plurality of bounding boxes. As described previously, each of the plurality of bounding boxes is associated with a corresponding classification value, i.e., a number of classes that a bounding box may be categorized into. For example, bounding box B1 may be associated with c1 number of classes, i.e., 1, 2, 3, . . . c1. Similarly, bounding box B2 may be associated with c2 number of classes, i.e., 1, 2, 3, . . . c2. Accordingly, each of the bounding boxes B1, B2, B3, . . . BN may be associated with corresponding classification values c1, c2, c3, . . . cN.

The box weight sub-module 216 may be configured to provide a weight to each of the plurality of bounding boxes based on the classification values, in that, a weight of a particular bounding box may be calculated as the number of classes that the particular bounding box is categorized into, i.e., the classification value of the particular bounding box. In an embodiment, to provide the weights, the box weight sub-module 216 may select a particular bounding box, provide the weight for that particular bounding box, and repeat the process by selecting each of the plurality of bounding boxes. Accordingly, each of the bounding boxes B1, B2, B3, . . . BN may be provided with corresponding weights c1, c2, c3, . . . cN.

The box threshold sub-module 218 may be configured to determine (or identify) a threshold area based on which relevant bounding boxes from the plurality of bounding boxes may be identified. The box threshold sub-module 218 may be configured to determine (or identify) a first parameter for each of the plurality of bounding boxes, the first parameter being a product of the corresponding area and the corresponding weights of the bounding boxes. For example, the first parameter for bounding box B1 may be determined (or identified) as being a1*c1. In an embodiment, to determine (or identify) the first parameter, the box threshold sub-module 218 may select a particular bounding box, determine (or identify) the first parameter for that particular bounding box, and repeat the process by selecting each of the plurality of bounding boxes. Accordingly, each of the bounding boxes B1, B2, B3, . . . BN may be associated with corresponding first parameters being a1*c1, a2*c2, a3*c3, . . . aN*cN.

The box threshold sub-module 218 may be configured to determine (or identify) a threshold area as a weighted average of the determined first parameters (or the identified first parameters) and the determined weights (or the identified weights) of the plurality of bounding boxes. In an embodiment, for bounding boxes B1, B2, B3, . . . BN, the threshold area may be determined (or identified) based on the formula:

$$\text{threshold area} = \frac{(a1*c1 + a2*c2 + a3*c3 + \ldots + aN*cN)}{c1 + c2 + c3 + \ldots + cN}$$

In an embodiment, the box area sub-module 214 may sort the bounding boxes B1, B2, B3, . . . BN in order of the determined area (or the identified area) a1, a2, a3, . . . , aN. In an embodiment, the bounding boxes may be sorted in ascending order. In an embodiment, the bounding boxes may be sorted in descending order. In an embodiment, to determine (or identify) the threshold area, the box threshold sub-module 218 may consider a predetermined number of bounding boxes from the plurality of bounding boxes B1, B2, B3, . . . BN. The predetermined number of bounding boxes may include bounding boxes having a greater area than the remaining bounding boxes.

In an embodiment, the box threshold sub-module 218 may select a predetermined number of bounding boxes from the sorted list of bounding boxes. In an embodiment, the predetermined number of bounding boxes may be one-third of the total number of bounding boxes. In an embodiment, the predetermined number of bounding boxes may be those bounding boxes which have corresponding areas greater than the remaining bounding boxes. For example, the bounding boxes may be sorted from lowest area to highest area and the predetermined number of bounding boxes may be the bounding boxes forming the highest one-third part of the sorted list.

Further, box threshold sub-module 218 may consider the predetermined number of bounding boxes for determining (or identifying) the threshold area, thereby eliminating interference from outliers effect. For example, considering the bounding boxes B1, B2, . . . BN having corresponding area, i.e., a1>a2>a3> . . . >aN, the predetermined number of bounding boxes may include bounding boxes B1, B2, B3, . . . Bx and the remaining bounding boxes may include bounding boxes Bx+1, Bx+2, . . . BN, where the number of bounding boxes B1, B2, B3, . . . Bx may be one-third of the total number of bounding boxes B1, B2, . . . , BN. The box threshold sub-module 218 may be configured to determine (or identify) the threshold area as:

$$\text{threshold area} = \frac{(a1*c1 + a2*c2 + a3*c3 + \ldots + ax*cx)}{c1 + c2 + c3 + \ldots + cx}$$

The box reducer sub-module 220 may be configured to determine (or identify) relevant bounding boxes from the plurality of bounding boxes based on the threshold area. As described above, each of the plurality of bounding boxes B1, B2, . . . BN is associated with a corresponding first parameter that is a product of corresponding area and corresponding weight, i.e., a1*c1, a2*c2, a3*c3, . . . aN*cN. The box reducer sub-module 220 may be configured to compare the corresponding first parameter of each of the plurality of bounding boxes with the threshold area and when the corresponding first parameter is greater than or equal to the threshold area, determine (or identify) the bounding boxes associated with the corresponding first parameter to be a relevant bounding box.

In an embodiment, to determine (or identify) relevant bounding boxes, the box reducer sub-module 220 may select a particular bounding box from the plurality of bounding boxes, determine (or identify) whether that particular bounding box is a relevant bounding box by comparison of the first parameter of that particular bounding box with the threshold area, and repeat the process for each of the plurality of bounding boxes. Accordingly, relevant bounding boxes, say, RB1, RB2, . . . RBx may be determined (or identified) from the plurality of bounding boxes B1, B2, B3, . . . BN. It would be apparent to a skilled person that a number of relevant bounding boxes may be less than or equal to the number of the plurality of bounding boxes.

The relevant bounding box module 212 thus determines (or identifies) relevant bounding boxes from the plurality of bounding boxes based on processing of the plurality of bounding boxes by the various sub-modules, namely, the box area sub-module 214, the box weight sub-module 216, the box threshold sub-module 218, and the box reducer sub-module 220.

Post determination of the relevant bounding boxes from the plurality of bounding boxes, the matrix generation module 222 may be configured to generate a set of reference parameters associated with the corresponding objects of the relevant bounding boxes. For each of the relevant bounding boxes, the matrix generation module 222 may determine (or identify) a reference parameter for the associated object, thereby generating the set of reference parameters.

As described previously, each of the plurality of bounding boxes, and consequently, each of the relevant bounding boxes, may be associated with a corresponding co-occurrence value and a corresponding area. The co-occurrence for a particular relevant bounding box may relate to a frequency of occurrence of an associated classified object within the particular relevant bounding box. For example, relevant bounding boxes RB1, RB2, . . . RBx, may be associated with corresponding areas ra1, ra2, . . . rax and corresponding co-occurrence values f1, f2, . . . fx. Based on the corresponding areas and the corresponding co-occurrence values, a reference parameter for each relevant bounding box may be generated. In an embodiment, the matrix generation module 222 may determine (or identify) the reference parameter for each of the relevant bounding boxes based on the product of the corresponding area and the corresponding co-occurrence value. As the spatial data related to the objects within the relevant bounding boxes is being considered for generation of the reference parameters, more accurate results can be achieved.

For instance, a reference parameter for relevant bounding box RB1 may be determined (or identified) as being ra1*f1. Accordingly, each of the relevant bounding boxes RB1, RB2, RB3, . . . RBx may be associated with corresponding reference parameters being ra1*f1, ra2*f2, ra3*f3, . . . rax*fx. A set of reference parameters can then be generated by the matrix generation module 222 comprising the determined reference parameters (or the identified reference parameters). In an embodiments, the set of reference parameters may be in the form of a co-occurrence matrix where the reference parameters form the matrix values. In an embodiment, the set of reference parameters may be represented as:

| | | | |
|---|---|---|---|
| ra1*f1 | ra2*f2 | ra3*f3 | ra4*f4 |
| ra5*f5 | ra6*f6 | ra7*f7 | ra8*f8 |
| . . . | . . . | . . . | rax*fx |

Post generation of the set of reference parameters, such as in the form of a co-occurrence matrix, the graph converter module 224 may be configured to convert the set of reference parameters into a knowledge graph. In an embodiment, the graph converter module 224 may comprise a force directed algorithm. In an embodiment, the graph converter module 224 may convert the set of reference parameters in the form of nodes and positions the nodes in a two-dimensional or a three-dimensional place, with each node representing objects of the relevant bounding boxes.

The clustering module 226 may be configured to process the knowledge graph generated by the graph converter module 224. The clustering module 226 may be configured to cluster similar nodes of the knowledge graph. In particular, the clustering module 226 may categorizing the corresponding objects of the relevant bounding boxes into object clusters. In an embodiment, the clustering module 226 comprises a hierarchical clustering algorithm. In an embodiment, the clustering module 226 comprises an agglomerative clustering algorithm. The clustering module 226 may thus be configured to identify (or determine) object clusters associated with the rendered image based on processing of the set of reference parameters.

Post identification of object clusters associated with the rendered image by the clustering module 226, the reference image module 228 may be configured to identify (or determine) one or more reference images. The reference image module 228 may identify (or determine) one or more reference images such that the identified reference images (or the determined reference images) have reference object clusters substantially similar to the object clusters associated with the rendered image. In an embodiments, the reference image module 228 may identify (or determine) the one or more reference images from an external network, such as internet. In an embodiment, the reference image module 228 may identify (or determine) the one or more reference images from prestored reference images in the memory 115, for instance, the recommendation memory 115C.

The reference image module 228 may be configured to retrieve reference configurations associated with the identified reference images (or the determined reference images). In an embodiment, the reference image module 228 may retrieve the reference configurations from the internet. In an embodiment, the reference image module 228 may retrieve the reference configurations from a cloud-based storage unit. In an embodiment, the reference image module 228 may retrieve the reference configurations from the recommendation memory 115C.

The system 110 thus identifies (or determines) one or more reference images and the corresponding reference configurations based on processing, by the one or more modules 111, of the image rendered on the user device 150. Referring again to FIG. 1B, the system 110 may be configured to cause the electronic device 150 to display the one or more reference images on the user interface 154. In an embodiment, the one or more reference images may be displayed by means of a camera application within the electronic device 150. In an embodiment, the one or more reference images may be displayed in response to the user 151 of the electronic device 150 requesting the reference images to be displayed on the user interface 154. In an embodiment, configurations associated with the one or more reference images may be displayed on the user interface 154.

As the one or more reference images are displayed on the user interface 154, the user 151 may select an appropriate reference image. In an embodiment, the user 151 may be enabled to preview the one or more reference images on the user interface 154 in order to select an appropriate reference image from the one or more reference images. In an embodiment, the user 151 may be enabled to browse through the one or more reference images in order to select the most appropriate reference image. In an embodiment, the user 151 may be enabled to provide a user input, such as by touch, to select the appropriate reference image from the one or more reference images being displayed on the user interface 154 of the user device 150.

The system 110 may be configured to receive the user input indicative of selection of the appropriate reference image from the electronic device 150. As described previously, each of the one or more reference images have corresponding reference configurations. The system 110 may further be configured to cause the camera 152 of the electronic device 150 to adopt configurations similar to the reference configurations of the appropriate reference image selected by the user 151. In an embodiment, the system 110 may be configured to receive the user input from the electronic device 150 via the transceiver 114, retrieve the reference configurations associated with the appropriate reference image from the memory 115, and provide the reference configurations to the camera 152 via the transceiver 114 so that the camera 152 adjusts its configurations to match the reference configurations. As described above, the term 'reference configurations' associated with one or more reference images may relate to configurations of a reference camera used to capture (or obtain) the one or more reference images.

The system 110 may be configured to control the camera 152 to capture (or obtain) the image using the adopted configurations. In an embodiment, the image may be captured (or obtained) in response to receiving a user input indicative of a command to capture (or obtain) the image. For instance, the user 151 may provide the user input to capture (or obtain) the image by clicking on a capture button being displayed on the user interface 154 via a camera application. Once the image is captured, the captured image may be stored in the memory 115. In an embodiment, the configurations of the camera 152 at the time of capturing (or obtaining) the image may be stored in association with the captured image (or the obtained image). Accordingly, the system 110 may be configured to configure the camera 152 of the electronic device 150 based on the reference configurations of the one or more reference images.

In an embodiment, at least one of the one or more modules 111 may be use an AI model for dynamic configuration generation. The AI model may also be used for enhancing the suggesting and recommending configurations for every subsequent image capture event (or every subsequent image obtain event). A function associated with AI may be performed through the non-volatile memory, the volatile memory, and the processor 112.

The processor 112 may include one or a plurality of processors. One or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule stored in the non-volatile memory or may employ a suitable artificial intelligence (AI) model executed from a server or a local memory module.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning technique is a method for training a predetermined target device (e.g., a robot) using a plurality of learning data to cause, allow, or control the target device to make an identifying, a determination or prediction. Examples of learning techniques include, but are not limited to, supervised learning, unsupervised learning, semi-supervised learning, active learning and reinforcement learning.

According to the disclosure, in a method of the electronic device 150, a method for adjusting camera configurations may use an artificial intelligence model by processing rendered images as data. The processor 112 may perform a pre-processing operation on the data to convert it into a form appropriate for use as an input for the artificial intelligence (AI) model.

Reasoning prediction is a technique of logically reasoning and predicting by determining (or identifying) information and includes, e.g., knowledge-based reasoning, optimization prediction, preference-based planning, or recommendation.

Figure 3A:
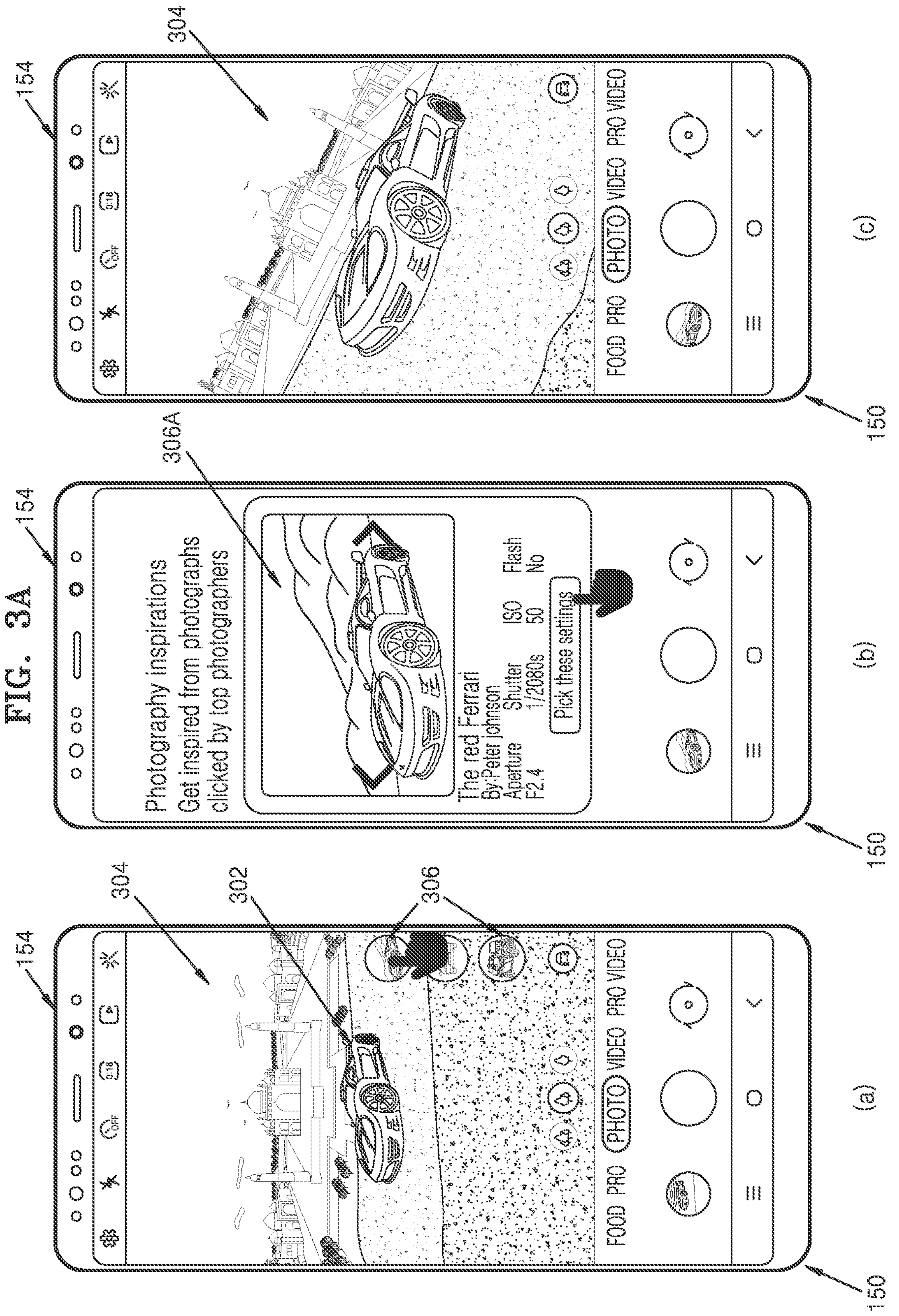
FIGS. 3A and 3B illustrate one or more example usage scenarios of the system for adjusting camera configurations in the user device, according to an embodiment of the disclosure.
Figure 3B:
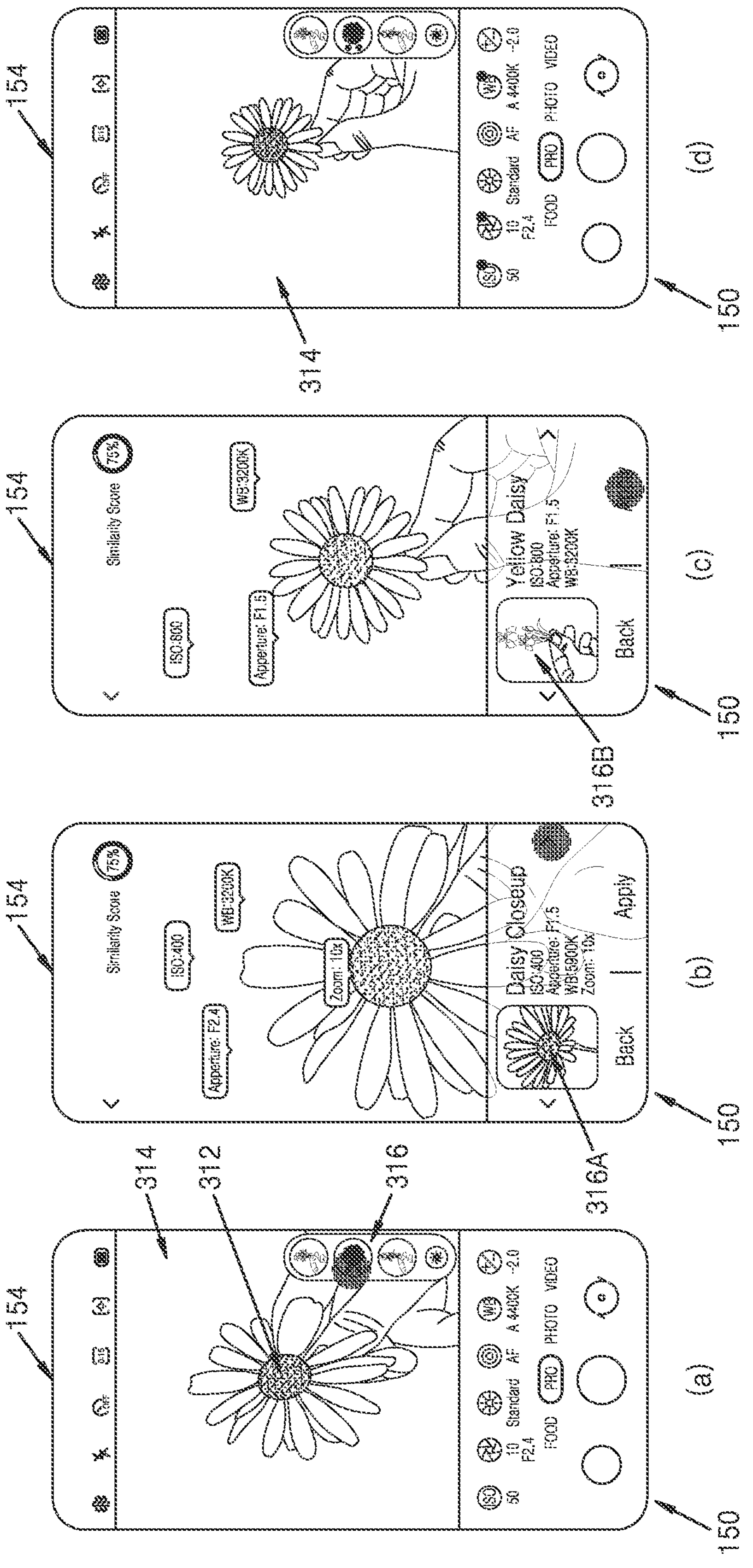

FIGS. 3A-3B illustrate various example usage scenarios of the electronic device 150 for adjusting camera configurations, according to one embodiment of the disclosure. FIGS. 3A-3B may be referred to as illustrative various example usage scenarios of the system 110 for adjusting camera configurations, according to one embodiment of the disclosure.

FIG. 3A illustrates the electronic device 150 being used to capture (or obtain) the scene 160 having a vehicle 302 as an object. The electronic device 150 may reproduce the scene 160 having the vehicle 302 in the form of an image 304 on the user interface 154, via the view finder 155 of a camera application as shown in part (a) of FIG. 3A. In an embodiment, the electronic device 150 may communicate with the system 110 and may receive one or more reference images 306 recommended by the system 110. In an embodiment, the electronic device 150 may recommend one or more reference images 306 based on reference images stored in the electronic device 150. The electronic device 150 may display one or more reference images 306 on the user interface 154 via the view finder 155 and the electronic device 150 may select any of the reference images for preview based on a user input for selecting any of the reference images. The user input may be input via the user interface 154. For instance, as shown in part (b) of FIG. 3A, the electronic device 150 may display a selected reference image 306A as a preview image. The electronic device 150 may display the configurations related to the selected reference image 306A. The electronic device 150 may display the configurations related to the selected reference image 306A on the user interface 154 (or a display included in the user interface 154). Accordingly, the user 151 may preview multiple reference images 306 before finalizing a particular reference image. Upon selecting a particular reference image, the electronic device 150 may modify camera configurations of the camera 152 to match the camera configurations related to the particular reference image. A user input for selecting the particular reference image may be received via the user interface 154. For instance, the user 151 may click on a 'pick these settings' option on the user interface 154 to facilitate the electronic device 150 to modify the camera configurations. As shown in part (c) of FIG. 3A, the electronic device 150, in particular, the camera 152 of the electronic device 150 has adopted the configurations related to the particular reference image. This is evident from comparing the image 304 being displayed on the user interface 154 in parts (a) and the image 304 being displayed on the user interface 154 in part (c) of FIG. 3A. In subsequent image capturing instances (or subsequent image obtaining instances), the electronic device 150 may process to capture (or obtain) the image 304 and generate an enhanced image using the configuration adopted by the camera 151 of the electronic device 150.

FIG. 3B illustrates the electronic device 150 being used to capture (or obtain) a scene having a flower 312 as an object. The electronic device may reproduce the scene having the flower 312 in the form of an image 314 on the user interface 154 via a view finder 155 of a camera application as shown in part (a) of FIG. 3B. The electronic device 150 may communicate with the system 110 and may receive one or more reference images 316 recommended by the system 110. The electronic device 150 may display the one or more reference images 316 on the user interface 154 and may select any of the reference images for preview based on a user input. The user input may be input via the user interface 154. For instance, as shown in part (b) of FIG. 3B, the electronic device 150 may display a selected reference image 316A as a preview image on the user interface 154. The electronic device 150 may display the configurations related to the selected reference image 316A on the user interface 154, and further, may display a preview image of the image 314 having the configurations of the selected reference image 316A. The electronic device 150 may preview multiple reference images 316 before finalizing a particular reference image. For instance, as shown in part (c) of FIG. 3B, the electronic device 150 may preview another reference image 316B on the user interface 154 and display the image 314 having the configurations of the selected reference image 316B. The electronic device 150 may finalize a reference image based on a user input, such as reference image 316B in part (c), the user input may be received by click on an 'Apply' option on the user interface 154. The electronic device 150 may receive the user input for selecting the reference image and then control the electronic device 150, in particular the camera 151 of the electronic device 150, to adopt configurations similar to the camera configurations related to the selected reference image. The system 110 may receive the user input for selecting the reference image from the electronic device 150 and then control the electronic device 150, in particular the camera 151 of the electronic device 150, to adopt configurations similar to the camera configurations related to the selected reference image. As shown in part (d) of FIG. 3B, the camera modifications of the electronic device 150 have been modified and the image 314 being displayed on the user interface 154 has improved characteristics as compared to image 314 in part (a) of FIG. 3B. In subsequent image capturing instances (or subsequent image obtaining instances), the electronic device 150 may process to capture (or obtain) the image and may generate an enhanced image using the configuration adopted by the camera 151 of the electronic device 150.

Figure 4A:
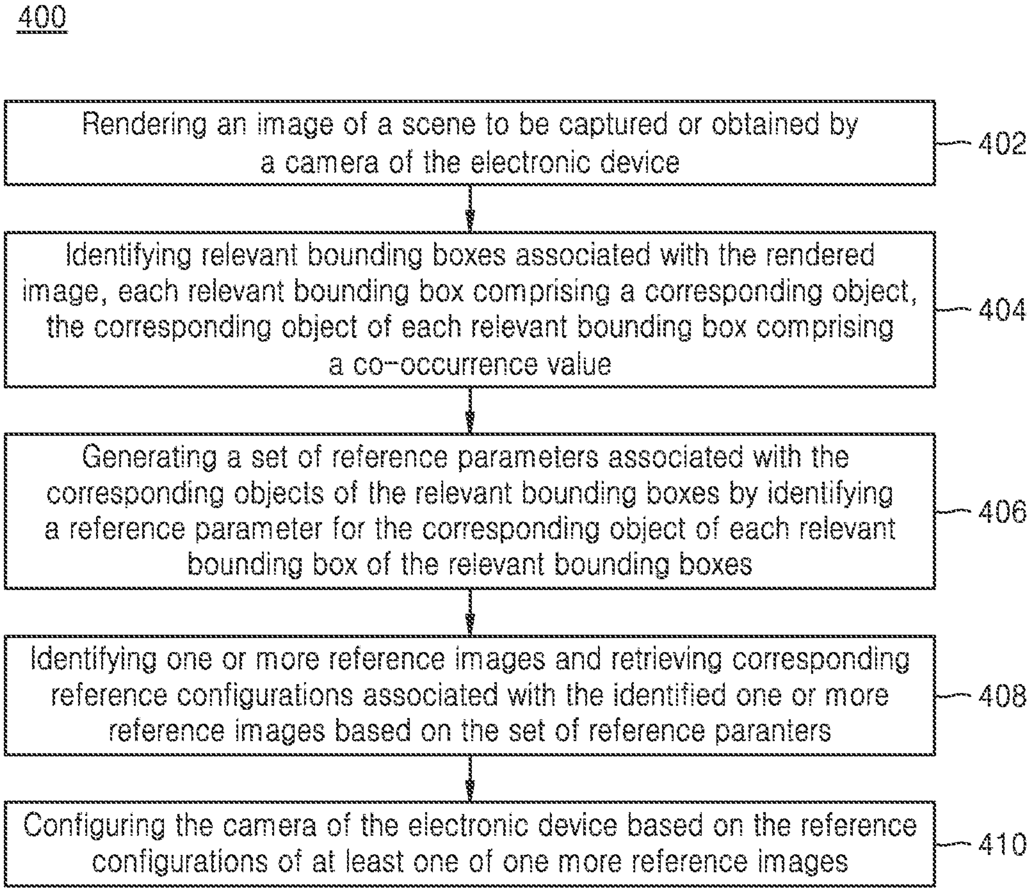
FIGS. 4A, 4B, 4C, and 4D illustrate example process flows for adjusting camera configurations in a user device, according to an embodiment of the disclosure.

FIG. 4A illustrates an example process flow of a method 400 for adjusting camera configurations in the electronic device 150, according to an embodiment of the disclosure. In an embodiment, the operations of the method 400 may be performed by the electronic device 150 (a processor 157 of the electronic device 150). In an embodiment, the operations of the method 400 may be performed by the system 110, for instance, by the processor 112 of the system 110 in conjunction with the one or more modules 111 and the memory 115, which may be integrated within the user device 150 or provided separately and are operatively coupled. In an embodiment, the operations of the method 400 may be performed by interaction (or co-operation) between the electronic device 150 and the system 110.

In operation 402, the method 400 includes rendering an image, being indicative of the scene 160 to be captured (or obtained) by the camera 152 of the electronic device 150. In an embodiment, rendering the image may be indicative of the scene 160 to be captured (or obtained) and comprises rendering the image on the view finder 155 of the electronic device 150.

In operation 404, the method 400 includes identifying (or determining) relevant bounding boxes associated with the rendered image, wherein each relevant bounding box has a corresponding object. The corresponding object of each relevant bounding box has a respective co-occurrence value. As described previously, the co-occurrence for a specific relevant bounding box may relate to a frequency of occurrence of the corresponding object within the specific relevant bounding box. The co-occurrence value may include a value that indicates the occurrence frequency of corresponding object within the specific relevant bounding box. In an embodiment, the method 400 includes generating a plurality of bounding boxes associated with the image.

In an embodiment, the method 400 includes identifying (or determining) the relevant bounding boxes from the plurality of bounding boxes based on respective areas of the plurality of bounding boxes and respective classification values of the plurality of bounding boxes. The classification value of each of the plurality of bounding boxes may be indicative of a number of classes that the corresponding bounding box is categorized into. In an embodiment, the method 400 may comprise identifying (or determining or detecting) the classification value by processing each of the plurality of bounding boxes. In an embodiment, the method 400 may comprise selecting a bounding box and for each bounding box, identifying (or determining or detecting) a confidence value associated with the selected bounding box and classifying the corresponding object within the selected bounding box into a number of classes based on the identified confidence value (or determined confidence value or detected confidence value). As described above, the confidence value may indicate a probability value of presence of a predetermined class associated with the corresponding object within a bounding box.

Figure 4B:
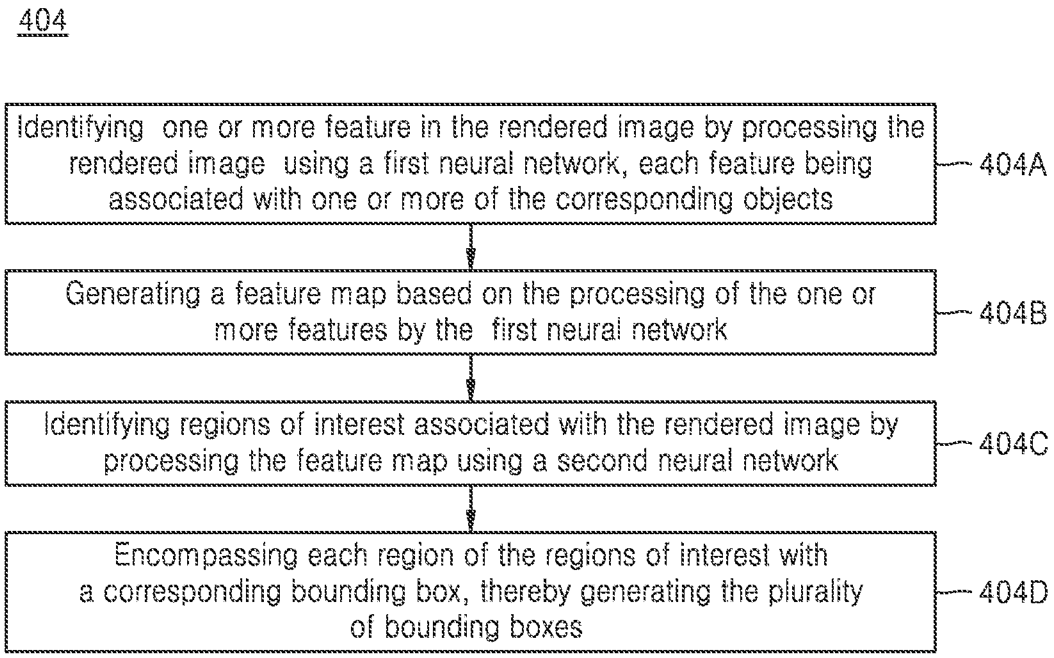

In an embodiment, to generate the plurality of bounding boxes, the method 400 may comprise operations 404A-404D as illustrated in FIG. 4B. At operation 404A, the method 400 may comprise identifying (or determining) one or more features contained in the rendered image by processing the rendered image through a first neural network, each feature being associated with one or more of the corresponding objects. At operation 404B, the method 400 may comprise generating a feature map based on the processing of the one or more features by the first neural network. In an embodiment, the first neural network may be an artificial neural network (ANN). In an embodiment, the first neural network may comprise a Residual Neural Network (ResNet).

In operation 404C, the method 400 may comprise identifying (or determining) multiple regions of interest associated with the rendered image by processing the feature map through a second neural network. At operation 404D, the method 400 may comprise encompassing each of the multiple regions of interest with a corresponding bounding box. The plurality of bounding boxes may thus be generated.

Figure 4C:
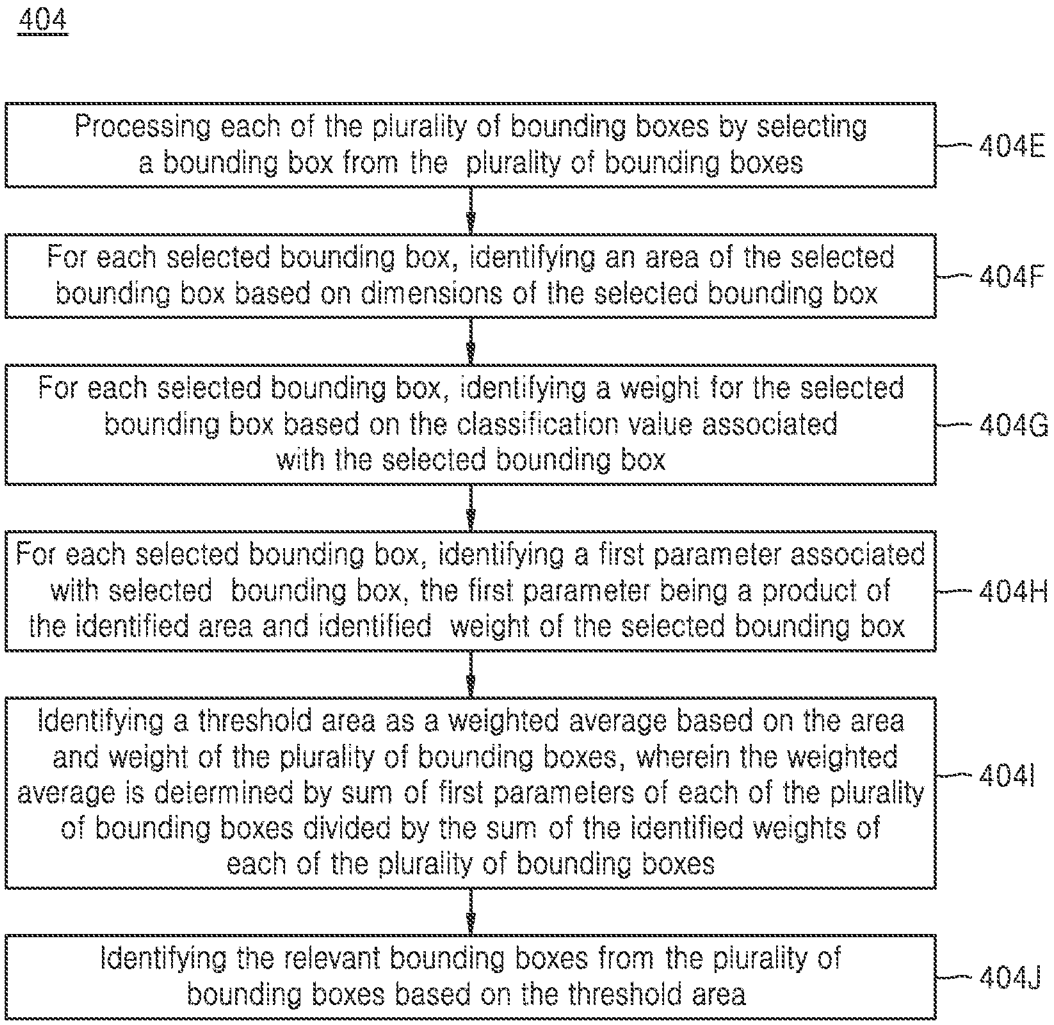

In an embodiment, to determine the relevant bounding boxes from the plurality of bounding boxes, the method 400 may comprise operations 404E-404J as illustrated in FIG. 4C. At operation 404E, the method 400 may comprise processing each of the plurality of bounding boxes by selecting a bounding box from the plurality of bounding boxes. At operation 404F, the method 400 may comprise, for each selected bounding box, identifying (or determining) an area of the selected bounding box based on dimensions of the selected bounding box. In an embodiment, dimensions of the bounding box may include a width and a height of the bounding box. In an embodiment, the method 400 may comprise generating a sorted list of the plurality of bounding boxes arranged in order of the determined areas of the plurality of bounding boxes and selecting a predetermined number of bounding boxes from the sorted list, the predetermined number of bounding boxes having a greater area than non-selected boxes of the sorted list. In an embodiment, the method 400 may comprise identifying (or determining) the threshold area as a weighted average based on the area and weight of the predetermined number of bounding boxes.

In operation 404G, the method 400 may comprise, for each selected bounding box, providing a weight to the selected bounding box based on the classification value associated with the selected bounding box. At operation 404H, the method 400 may comprise, for each selected bounding box, identifying (or determining) a first parameter associated with selected bounding box, the first parameter being a product of the identified area (or determined area) and identified weight (or determined weight) of the selected box.

In operation 404I, the method 400 may comprise identifying (or determining) a threshold area as a weighted average based on the area and weight of the plurality of bounding boxes. The weighted average may be determined by sum of first parameters of each of the plurality of bounding boxes divided by the sum of the determined weights of each of the plurality of bounding boxes.

In operation 404J, the method 400 may comprise identifying (or determining) the relevant bounding boxes from the plurality of bounding boxes based on the threshold area. In an embodiment, the method 400 may comprise selecting a bounding box from the plurality of bounding boxes and for each selected bounding box comparing the first parameter of the selected bounding box with the threshold area. In an embodiment, the method 400 may comprise identifying (or determining) the selected bounding box to be a relevant bounding box when the first parameter is greater than or equal to the threshold area.

Referring back to FIG. 4A, in operation 406, the method 400 includes generating a set of reference parameters associated with the corresponding objects of the relevant bounding boxes by identifying (or determining) a reference parameter for the corresponding object of each of the relevant bounding boxes. In an embodiment, the reference parameter may be identified (or determined) based on a product of the respective co-occurrence value of the corresponding object and an area of the corresponding relevant bounding box of the corresponding object.

In operation 408, the method 400 includes identifying (or determining) one or more reference images and retrieving corresponding reference configurations associated with the identified one or more reference images (or determined one or more reference images) based on the set of reference parameters. In an embodiment, the reference configurations may be retrieved from a storage unit, for instance, a memory 153 of the electronic device 150, the memory 115 of the system 110, or a cloud-based storage unit. In an embodiment, the method 400 may comprise identifying (or determining) object clusters associated with the rendered image based on the generated set of reference parameters and identifying (or determining) the one or more reference images having reference object clusters substantially similar to the identified object clusters (or determined object clusters) associated with the rendered image. In an embodiment, the method 400 may comprise converting the set of reference parameters into a knowledge graph and categorizing the corresponding objects of the relevant bounding boxes into object clusters by processing the knowledge graph, thereby identifying the object clusters.

In operation 410, the method 400 includes configuring the camera 152 of the electronic device 150 based on the reference configurations of at least one of one or more reference images.

Figure 4D:
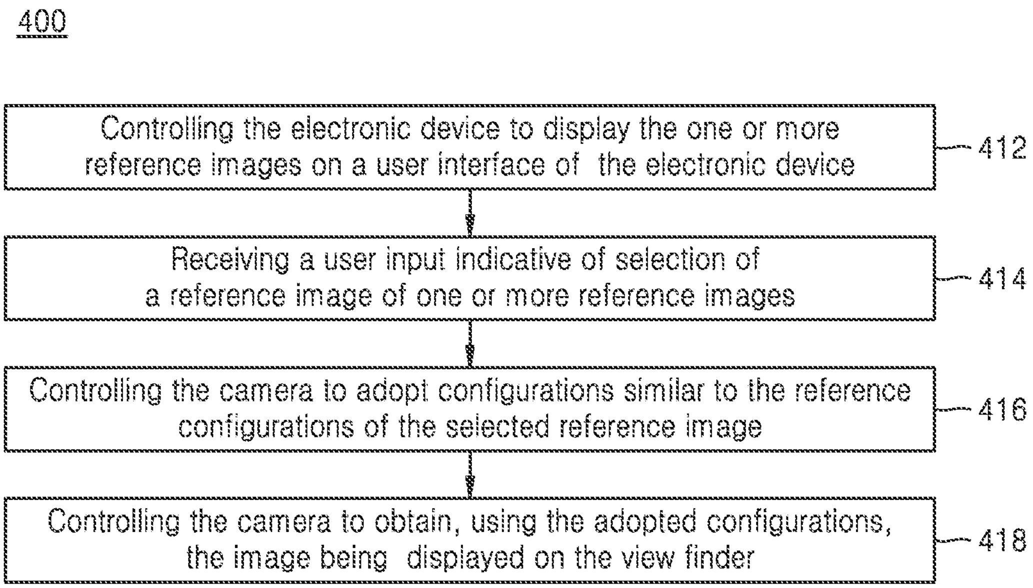

In an embodiment, the method 400 may further comprise operations 412-418, as illustrated in FIG. 4D. In operation 412, the method 400 may comprise controlling (or causing) the electronic device 150 to display the one or more reference images on the user interface 154 of the electronic device 150. At operation 414, the method 400 may comprise receiving a user input indicative of selection of a reference image of the one or more reference images. In operation 416, the method 400 may comprise controlling (or causing) the camera 152 to adopt configurations similar to the reference configurations of the selected reference image. In operation 418, the method 400 may comprise controlling (or causing) the camera 152 to capture (or obtain), using the adopted configurations, the image being displayed on the view finder 155.

Although the above discussed operations in FIG. 4A-4D are shown and described in a particular sequence, the operations may occur in variations to the sequence in accordance with various embodiments.

Figure 5:
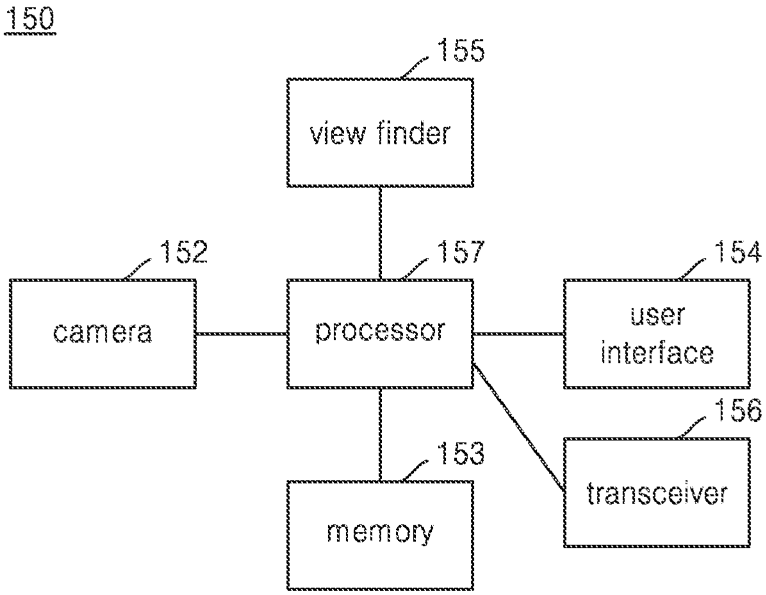
FIG. 5 illustrates a schematic block diagram of an electronic device for adjusting camera configurations, according to an embodiment of the disclosure.

FIG. 5 illustrates a schematic block diagram of the electronic device 150 for adjusting camera configurations, according to an embodiment of the disclosure. Referring to FIG. 5, the electronic device 150 may comprise the processor 157, the camera 152, the memory 153, the user interface 154, the view finder 155, and a transceiver 156.

The processor 157 may be configured to control all of the function of the electronic device 150. The processor 157 may be configured to perform the method 400 of FIG. 4A~4D. The processor 157 may include at least one processor (or data processor). In an embodiment, the processor 157 may include the modules 111 shown FIG. 2. In an embodiment, the processor 157 may include at least one processor (or data processor) for executing processes in Virtual Storage Area Network. The processor 157 may include specialized processing units such as, integrated system (bus) controllers, memory management control units, floating point units, graphics processing units, digital signal processing units, etc. In an embodiment, the processor 157 may include a central processing unit (CPU), a graphics processing unit (GPU), or both. The processor 112 may be one or more general processors, digital signal processors, application-specific integrated circuits, field-programmable gate arrays, servers, networks, digital circuits, analog circuits, combinations thereof, or other now known or later developed devices for analyzing and processing data. The processor 157 may execute a software program, such as a code to perform the operation.

The processor 157 may be in communication with one or more other devices (for example, the system 110) via the transceiver 156. In an embodiment, the processor 157 may communicate with the system 110 using the transceiver 156. In an embodiment, the transceiver 156 may include a communication interface or a network interface. The communication interface or the network interface may use communication code-division multiple access (CDMA), high-speed packet access (HSPA+), global system for mobile communications (GSM), long-term evolution (LTE), WiMax, or the like, etc. The communication interface may include at least one of a short-range communication interface, such as Bluetooth, NFC(Near Field Communication), Wi-Fi, or Zigbee and a long-range communication interface, such as Ethernet, LTE (Long Term Evolution), or internet. The network interface may include a variety of communication interfaces. For example, the network interface may be configured to include Ethernet, Wi-Fi, and LET.

The processor 112 may be disposed in communication with a communication network via a network interface. In an embodiment, the network interface may include the I/O interface 113. The network interface may connect to the communication network to enable connection of the system 110 with the electronic device 150 and/or outside environment. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface and the communication network, the electronic device 150 may communicate with other devices. The network interface may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

For example, although only one transceiver 156 is illustrated in FIG. 5, according to an embodiment, the electronic device 150 may include multiple transceivers 156, or may not include a transceiver 156, and may include one or more other elements for interaction between the electronic device 150 and other electronic devices (for example, the system 100).

In an embodiment, the memory 153 may be communicatively coupled to the processor (or at least one processor) 157. The memory 153 may be configured to store data, instructions executable by the at least one processor 157. In an embodiment, the memory 153 may be provided within the at least one processor 157. In an embodiment, the memory 153 may communicate with the processor 157 via a bus within the electronic device 150. In an embodiment, the memory 153 may communicate with the processor 112 via the transceiver 156 or the processor 157 within the electronic device 150. In an embodiment, the memory 153 may be located remote from the processor 157, and may be in communication with the processor 157 via a network. The memory 153 may include, but is not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 153 may include a cache or random-access memory for the processor 157. In alternative examples, the memory 153 is separate from the processor 157, such as a cache memory of a processor, the system memory, or other memory. The memory 153 may be an external storage device or database for storing data. The memory 153 may be operable to store instructions executable by the processor 157. The functions, acts or tasks illustrated in the figures or described may be performed by the programmed processor 157 for executing the instructions stored in the memory 153. The functions, acts or tasks are independent of the particular type of instructions set, storage media, processor or processing strategy and may be performed by software, hardware, integrated circuits, firmware, micro-code and the like, operating alone or in combination. Processing strategies may include multiprocessing, multitasking, parallel processing, and the like.

In an embodiment, the one or more modules 111 may be included within the memory 153. the one or more modules 111 may be included within the processor 157. The memory 153 may further include a database 115A to store data. The one or more modules 111 may include a set of instructions that may be executed to cause the electronic device 150, in particular, the processor 157 of the electronic device 150, to perform any one or more of the methods/processes disclosed herein. The one or more modules 111 may be configured to perform the operations of the disclosure using the data stored in the database 115A, to process rendered image and cause modification of camera configurations of the camera 152 of the electronic device 150. For instance, the one or more modules 111 may be configured to perform the operations disclosed in FIGS. 4A-4D. The operations disclosed in FIGS. 4A-4D performed by the one or more modules 111 may be perform by the processor 157. In an embodiment, each of the one or more modules 111 may be a hardware unit which may be outside the memory 153. Further, the memory 153 may include an operating system 115B for performing one or more tasks of the electronic device 150, as performed by a generic operating system.

The memory 153 may also include a recommendation memory 115C configured to store a plurality of reference images in association with corresponding reference configurations. The corresponding reference configurations associated with the plurality of reference images may relate to configurations of a reference camera used to capture (or obtain) the plurality of reference images. In particular, the reference configurations of each reference image refer to configurations adopted by a reference camera (for example, of the electronic device 150 using which the reference image was captured (or obtained)) at the time of capturing (or obtaining) that particular reference image. In an embodiment, the recommendation memory 115C may comprise pre-stored reference images. In an embodiment, the recommendation memory 115C may be in communication with the internet and reference images may be dynamically stored in the recommendation memory 115C.

The memory 153 may also include a display image memory 115D configured to store image data related to images rendered on the user interface 154 of the electronic device 150, such as, by means of the view finder 155 of the electronic device 150. The memory 153 may also include a captured image memory 115E configured to store images that are captured by the camera 152 of the electronic device 150. In an embodiment, each of the images captured by the camera 152 may be stored in association with corresponding configurations, i.e., configurations of the camera 152 at the time of capturing the images.

The viewfinder 155 may include a device that allow the user 151 to see the camera's view, which helps the user 151 frame the user's shot and focus on a subject more accurately. For example, in an embodiment, the viewfinder 155 may display at least one of the image of the scene 160, the relevant bounding boxes, one or more reference images, the selected reference image, the image obtained based on the adopted configuration, or the user interface 154 for receiving a user input for selecting one of at least one item displayed on the viewfinder 155, but the viewfinder 155 is not limited to the above. The viewfinder 155 may be controlled by the processor 157 to perform the above-described operation.

The disclosure provides for various technical advancements based on the key features discussed above. The disclosure may allow users to capture (or obtain) enhanced and high-quality images as camera configurations of a device associated with the user can be automatically adjusted based on recommended images. Accordingly, casual users who are unaware of various adjustable camera configurations can capture high-quality images. For example, by means of the electronic device (or systems) and methods described, an image can be captured (obtained) with an optimal ISO, shutter speed, aperture, exposure, etc.

In an embodiment, the identifying 404 the relevant bounding boxes comprises: generating a plurality of bounding boxes associated with the image; and identifying the relevant bounding boxes from the plurality of bounding boxes based on respective areas of the plurality of bounding boxes and a respective classification value of each of the plurality of bounding boxes, and wherein the classification value of each of the plurality of bounding boxes is indicative of a number of classes that a corresponding bounding box is categorized into.

In an embodiment, the generating the plurality of bounding boxes comprises: identifying 404A one or more features in the rendered image by processing the rendered image using a first neural network, each feature being associated with one or more of the corresponding objects; generating 404B a feature map based on the processing of the one or more features by the first neural network; identifying 404C regions of interest associated with the rendered image by processing the feature map using a second neural network; encompassing 404D each region of the regions of interest with the corresponding bounding box; and generating 404D the plurality of bounding boxes.

In an embodiment, the method 400 further comprises identifying the classification value by: processing each bounding box of the plurality of bounding boxes by selecting a bounding box from the plurality of bounding boxes and for each selected bounding box: identifying a confidence value associated with the selected bounding box, wherein the confidence value indicates a probability value of a presence of a predetermined class associated with the corresponding object within the selected bounding box; classifying the corresponding object within the selected bounding box into the number of classes based on the identified confidence value; and identifying the classification value associated with the selected bounding box.

In an embodiment, the identifying 404 the relevant bounding boxes from the plurality of bounding boxes further comprises: processing 404E each of the plurality of bounding boxes by selecting a bounding box from the plurality of bounding boxes: identifying 404F an area of the selected bounding box based on dimensions of the selected bounding box; identifying 404G a weight for the selected bounding box based on the classification value associated with the selected bounding box; identifying 404H a first parameter associated with the selected bounding box, the first parameter being a product of the identified area and the weight of the selected bounding box; identifying 404I a threshold area as a weighted average based on the area and the weight of the plurality of bounding boxes, wherein the weighted average is determined by sum of first parameters of each of the plurality of bounding boxes divided by the sum of the identified weights of each of the plurality of bounding boxes; and identifying 404J the relevant bounding boxes from the plurality of bounding boxes based on the threshold area.

In an embodiment, the identifying 404J the relevant bounding boxes based on the threshold area comprises: selecting a bounding box from the plurality of bounding boxes and for each selected bounding box: comparing the first parameter of the selected bounding box with the threshold area; and identifying the selected bounding box as a relevant bounding box based on the first parameter being greater than or equal to the threshold area.

In an embodiment, the identifying 404I the threshold area comprises: generating a sorted list of the plurality of bounding boxes arranged in order of the identified areas of the plurality of bounding boxes; selecting a predetermined number of bounding boxes from the sorted list, the predetermined number of bounding boxes having a greater area than non-selected boxes of the sorted list; and identifying the threshold area as the weighted average based on the area and the weight of the predetermined number of bounding boxes.

In an embodiment, the co-occurrence value corresponds to a frequency of occurrence of the corresponding object within a corresponding bounding box, and wherein the reference parameter is identified based on a product of the co-occurrence value of the corresponding object and an area of a corresponding relevant bounding box of the corresponding object.

In an embodiment, the identifying 408 the one or more reference images comprises: identifying object clusters associated with the rendered image based on the generated set of reference parameters; and identifying the one or more reference images comprising reference object clusters similar to the identified object clusters associated with the rendered image.

In an embodiment, the identifying the object clusters associated with the rendered image comprises: converting the set of reference parameters into a knowledge graph; and categorizing the corresponding objects of the relevant bounding boxes into the object clusters by processing the knowledge graph.

In an embodiment, the retrieving 408 the corresponding reference configurations associated with the identified one or more reference images comprises retrieving the corresponding reference configurations from a storage, and the storage is one of a memory 153 of the electronic device 150 and a cloud based storage.

In an embodiment, the rendering 402 the image of the scene to be obtained comprises rendering the image on a view finder 155 of the electronic device 150.

In an embodiment, the method 400 comprises controlling 412 the electronic device 150 to display the one or more reference images on a user interface 154 of the electronic device 150; receiving 414 a user input of a selection of a reference image of the one or more reference images; controlling 418 the camera 152 to adopt configurations similar to the reference configurations of the selected reference image; and controlling 418 the camera 152 to obtain, using the adopted configurations, the image being displayed on the view finder 155.

In an embodiment, the at least one processor 157 is further configured to: generate a plurality of bounding boxes associated with the image; and identify the relevant bounding boxes from the plurality of bounding boxes based on respective areas of the plurality of bounding boxes and a respective classification value of each of the plurality of bounding boxes, and the classification value of each of the plurality of bounding boxes is indicative of a number of classes that a corresponding bounding box is categorized into.

In an embodiment, the at least one processor 157 is further configured to: identify one or more features in the rendered image by processing the rendered image through a first neural network, each feature being associated with one or more of the corresponding objects; generate a feature map based on the processing of the one or more features by the first neural network; identify regions of interest associated with the rendered image by processing the feature map through a second neural network; encompass each region of the regions of interest with a corresponding bounding box; and generate the plurality of bounding boxes.

In an embodiment, the at least one processor 157 is further configured to: process each bounding box of the plurality of bounding boxes by selecting a bounding box from the plurality of bounding boxes and for each selected bounding box: identify a confidence value associated with the selected bounding box, wherein the confidence value indicates a probability value of a presence of a predetermined class associated with the corresponding object within the selected bounding box; classify the corresponding object within the selected bounding box into the number of classes based on the identified confidence value; and identify the classification value associated with the selected bounding box.

In an embodiment, the at least one processor 157 is further configured to: process each of the plurality of bounding boxes by selecting a bounding box from the plurality of bounding boxes and for each selected bounding box: identify an area of the selected bounding box based on dimensions of the selected bounding box; identify a weight for the selected bounding box based on the classification value associated with the selected bounding box; identify a first parameter associated with the selected bounding box, the first parameter being a product of the identified area and the weight of the selected bounding box; identify a threshold area as a weighted average based on the area and the weight of the plurality of bounding boxes, wherein the weighted average is determined by sum of first parameters of each of the plurality of bounding boxes divided by the sum of the identified weights of each of the plurality of bounding boxes; and identify the relevant bounding boxes from the plurality of bounding boxes based on the threshold area.

In an embodiment, the at least one processor 157 is further configured to: select a bounding box from the plurality of bounding boxes and for each selected bounding box: compare the first parameter of the selected bounding box with the threshold area; and identify the selected bounding box as a relevant bounding box based on the first parameter being greater than or equal to the threshold area.

In an embodiment, the at least one processor 157 is further configured to: generate a sorted list of the plurality of bounding boxes arranged in order of the identified areas of the plurality of bounding boxes; select a predetermined number of bounding boxes from the sorted list, the predetermined number of bounding boxes having a greater area than non-selected boxes of the sorted list; and identify the threshold area as the weighted average based on the area and the weight of the predetermined number of bounding boxes.

In an embodiment, the co-occurrence value corresponds to a frequency of occurrence of the corresponding object within a corresponding bounding box, and the at least one processor 157 is further configured to identify the reference parameter based on a product of the co-occurrence value of the corresponding object and an area of a corresponding relevant bounding box of the corresponding object.

In an embodiment, the at least one processor 157 is further configured to: identify object clusters associated with the rendered image based on the generated set of reference parameters; and identify the one or more reference images having reference object clusters similar to the identified object clusters associated with the rendered image.

In an embodiment, the at least one processor 157 is further configured to: convert the set of reference parameters into a knowledge graph; and categorize the corresponding objects of the relevant bounding boxes into the object clusters by processing the knowledge graph.

In an embodiment, the at least one processor 157 is further configured to retrieve the corresponding reference configurations from a storage, the storage is at least one of a memory 153 of the electronic device 159 and a cloud-based storage.

In an embodiment, the at least one processor 157 is further configured to render the image on the view finder 155 of the electronic device 150, and the at least one processor 157 is further configured to: control the user device to display the one or more reference images on the user interface 154 of the electronic device 150; receive a user input of selecting a reference image of the one or more reference images; control the camera 152 to adopt configurations similar to the reference configurations of the selected reference image; and using the adopted configurations, control the camera 152 to obtain the image being displayed on the view finder 155.

In an embodiment, the electronic device 150 may comprise at least one memory 153, and at least one processor 151 configured to: identify relevant bounding boxes associated with an image, each relevant bounding box comprising a corresponding object, the corresponding object of each relevant bounding box comprising a co-occurrence value; generate a set of reference parameters associated with the corresponding objects of the relevant bounding boxes by identifying a reference parameter for the corresponding object of each relevant bounding box of the relevant bounding boxes; identify one or more reference images and retrieving corresponding reference configurations associated with the identified one or more reference images based on the set of reference parameters; and configure the camera based on the reference configurations of one or more reference images.

In an embodiment, the at least one processor 151 is further configured to: generate a plurality of bounding boxes associated with the image; and identify the relevant bounding boxes from the plurality of bounding boxes based on respective areas of the plurality of bounding boxes and a respective classification value of each of the plurality of bounding boxes, and the classification value of each of the plurality of bounding boxes is a number of classes that a corresponding bounding box is categorized into.

In an embodiment, the at least one processor 157 is further configured to: render the image; identify one or more features in the rendered image by processing the rendered image through a first neural network, each feature being associated with one or more of the corresponding objects; generate a feature map based on the processing of the one or more features by the first neural network; identify regions of interest associated with the rendered image by processing the feature map through a second neural network; encompass each region of the regions of interest with a corresponding bounding box; and generate the plurality of bounding boxes.

In an embodiment, a computer-readable recording medium having recorded thereon a program which, when executed by a computer, causes the computer to perform the method for adjusting camera configurations in an electronic device 150, the method 400 comprising: rendering 402 an image of a scene 160 to be obtained by a camera 152 of the electronic device 150; identifying 404 relevant bounding boxes associated with the image, each relevant bounding box comprising a corresponding object, the corresponding object of each relevant bounding box comprising a co-occurrence value; generating 406 a set of reference parameters associated with the corresponding objects of the relevant bounding boxes by identifying a reference parameter for the corresponding object of each relevant bounding box of the relevant bounding boxes; identifying 408 one or more reference images and retrieving corresponding reference configurations associated with the identified one or more reference images based on the set of reference parameters; and configuring 410 the camera 152 of the electronic device 150 based on the reference configurations of at least one of one or more reference images.

Although specific language has been used to describe the present subject matter, any limitations arising on account thereto, are not intended. As should be apparent, one or more modifications may be made. The drawings and the foregoing description give examples of embodiments. Those skilled in the art will appreciate that one or more of the described elements may be combined into a single functional element. Alternatively, certain elements may be split into multiple functional elements. Elements from one embodiment may be added to one or more other embodiments.

What is claimed is:

1. A method for adjusting camera configurations in an electronic device, the method comprising:

rendering an image of a scene to be obtained by a camera of the electronic device;

identifying relevant bounding boxes associated with the image, each relevant bounding box comprising a corresponding object, the corresponding object of each relevant bounding box comprising a co-occurrence value, wherein the co-occurrence value corresponds to a frequency of occurrence of the corresponding object within a corresponding bounding box;

generating a set of reference parameters associated with the corresponding objects of the relevant bounding boxes by identifying a reference parameter for the corresponding object of each relevant bounding box of the relevant bounding boxes;

identifying one or more reference images and retrieving corresponding reference configurations associated with the identified one or more reference images based on the set of reference parameters; and configuring the camera of the electronic device based on the reference configurations of at least one of one or more reference images, wherein the retrieving the corresponding reference configurations associated with the identified one or more reference images comprises retrieving the corresponding reference configurations from a storage, wherein the storage stores a plurality of reference images each in association with a corresponding reference configuration, the corresponding reference configuration representing camera settings adopted at the time of capturing the respective reference image.

2. The method of claim 1, wherein the identifying the relevant bounding boxes comprises:

generating a plurality of bounding boxes associated with the image; and identifying the relevant bounding boxes from the plurality of bounding boxes based on respective areas of the plurality of bounding boxes and a respective classification value of each of the plurality of bounding boxes, and wherein the classification value of each of the plurality of bounding boxes is indicative of a number of classes that a corresponding bounding box is categorized into.

3. The method of claim 2, wherein the generating the plurality of bounding boxes comprises:

identifying one or more features in the rendered image by processing the rendered image using a first neural network, each feature being associated with one or more of the corresponding objects;

generating a feature map based on the processing of the one or more features by the first neural network;

identifying regions of interest associated with the rendered image by processing the feature map using a second neural network;

encompassing each region of the regions of interest with the corresponding bounding box; and generating the plurality of bounding boxes.

4. The method of claim 2, further comprising identifying the classification value by:

processing each bounding box of the plurality of bounding boxes by selecting a bounding box from the plurality of bounding boxes and for each selected bounding box:

identifying a confidence value associated with the selected bounding box, wherein the confidence value indicates a probability value of a presence of a predetermined class associated with the corresponding object within the selected bounding box;

classifying the corresponding object within the selected bounding box into the number of classes based on the identified confidence value; and identifying the classification value associated with the selected bounding box.

5. The method of claim 2, wherein the identifying 404 the relevant bounding boxes from the plurality of bounding boxes further comprises:

processing each of the plurality of bounding boxes by selecting a bounding box from the plurality of bounding boxes:

identifying an area of the selected bounding box based on dimensions of the selected bounding box;

identifying a weight for the selected bounding box based on the classification value associated with the selected bounding box;

identifying a first parameter associated with the selected bounding box, the first parameter being a product of the identified area and the weight of the selected bounding box;

identifying a threshold area as a weighted average based on the area and the weight of the plurality of bounding boxes, wherein the weighted average is determined by sum of first parameters of each of the plurality of bounding boxes divided by the sum of the identified weights of each of the plurality of bounding boxes; and identifying the relevant bounding boxes from the plurality of bounding boxes based on the threshold area.

6. The method of claim 5, wherein the identifying the relevant bounding boxes based on the threshold area comprises:

selecting a bounding box from the plurality of bounding boxes and for each selected bounding box:

comparing the first parameter of the selected bounding box with the threshold area; and identifying the selected bounding box as a relevant bounding box based on the first parameter being greater than or equal to the threshold area.

7. The method of claim 5, wherein the identifying the threshold area comprises:

generating a sorted list of the plurality of bounding boxes arranged in order of the identified areas of the plurality of bounding boxes;

selecting a predetermined number of bounding boxes from the sorted list, the predetermined number of bounding boxes having a greater area than non-selected boxes of the sorted list; and identifying the threshold area as the weighted average based on the area and the weight of the predetermined number of bounding boxes.

8. The method of claim 1, wherein the reference parameter is identified based on a product of the co-occurrence value of the corresponding object and an area of a corresponding relevant bounding box of the corresponding object.

9. The method of claim 1, wherein the identifying the one or more reference images comprises:

identifying object clusters associated with the rendered image based on the generated set of reference parameters; and identifying the one or more reference images comprising reference object clusters similar to the identified object clusters associated with the rendered image.

10. The method of claim 9, wherein the identifying the object clusters associated with the rendered image comprises:

converting the set of reference parameters into a knowledge graph; and categorizing the corresponding objects of the relevant bounding boxes into the object clusters by processing the knowledge graph.

11. The method of claim 1, wherein the storage is one of a memory of the electronic device and a cloud based storage.

12. The method of claim 1, wherein the rendering the image of the scene to be obtained comprises rendering the image on a view finder of the electronic device, and wherein the method further comprises:

controlling the electronic device to display the one or more reference images on a user interface of the electronic device;

receiving a user input of a selection of a reference image of the one or more reference images;

controlling the camera to adopt configurations similar to the reference configurations of the selected reference image; and controlling the camera to obtain, using the adopted configurations, the image being displayed on the view finder.

13. An electronic device for adjusting camera configurations, the electronic device comprising:

at least one memory; and at least one processor communicatively coupled to the at least one memory, the at least one processor being configured to:

render an image of a scene to be obtained by a camera of the electronic device;

identify relevant bounding boxes associated with the image, each relevant bounding box comprising a corresponding object, the corresponding object of each relevant bounding box comprising a co-occurrence value, wherein the co-occurrence value corresponds to a frequency of occurrence of the corresponding object within a corresponding bounding box;

generate a set of reference parameters associated with the corresponding objects of the relevant bounding boxes by identifying a reference parameter for the corresponding object of each relevant bounding box of the relevant bounding boxes;

identify one or more reference images and retrieve corresponding reference configurations associated with the identified one or more reference images based on the set of reference parameters, wherein the corresponding reference configurations associated with the identified one or more reference images are retrieved by retrieving the corresponding reference configurations from a storage; and configure the camera based on the reference configurations of at least one of one or more reference images, wherein the storage stores a plurality of reference images each in association with a corresponding reference configuration, the corresponding reference configuration representing camera settings adopted at the time of capturing the respective reference image.

14. The electronic device of claim 13, wherein the at least one processor is further configured to:

generate a plurality of bounding boxes associated with the image; and identify the relevant bounding boxes from the plurality of bounding boxes based on respective areas of the plurality of bounding boxes and a respective classification value of each of the plurality of bounding boxes, and wherein the classification value of each of the plurality of bounding boxes is indicative of a number of classes that a corresponding bounding box is categorized into.

15. The electronic device of claim 14, wherein the at least one processor is further configured to:

identify one or more features in the rendered image by processing the rendered image through a first neural network, each feature being associated with one or more of the corresponding objects;

generate a feature map based on the processing of the one or more features by the first neural network;

identify regions of interest associated with the rendered image by processing the feature map through a second neural network;

encompass each region of the regions of interest with a corresponding bounding box; and generate the plurality of bounding boxes.

16. The electronic device as claimed in claim 14, wherein the at least one processor is further configured to:

process each bounding box of the plurality of bounding boxes by selecting a bounding box from the plurality of bounding boxes and for each selected bounding box:

identify a confidence value associated with the selected bounding box, wherein the confidence value indicates a probability value of a presence of a predetermined class associated with the corresponding object within the selected bounding box;

classify the corresponding object within the selected bounding box into the number of classes based on the identified confidence value; and identify the classification value associated with the selected bounding box.

17. The electronic device of claim 14, wherein the at least one processor is further configured to:

process each of the plurality of bounding boxes by selecting a bounding box from the plurality of bounding boxes and for each selected bounding box:

identify an area of the selected bounding box based on dimensions of the selected bounding box;

identify a weight for the selected bounding box based on the classification value associated with the selected bounding box;

identify a first parameter associated with the selected bounding box, the first parameter being a product of the identified area and the weight of the selected bounding box;

identify a threshold area as a weighted average based on the area and the weight of the plurality of bounding boxes, wherein the weighted average is determined by sum of first parameters of each of the plurality of bounding boxes divided by the sum of the identified weights of each of the plurality of bounding boxes; and identify the relevant bounding boxes from the plurality of bounding boxes based on the threshold area.

18. The electronic device of claim 17, wherein the at least one processor is further configured to:

select a bounding box from the plurality of bounding boxes and for each selected bounding box:

compare the first parameter of the selected bounding box with the threshold area; and identify the selected bounding box as a relevant bounding box based on the first parameter being greater than or equal to the threshold area.

19. The electronic device of claim 17, wherein the at least one processor is further configured to:

generate a sorted list of the plurality of bounding boxes arranged in order of the identified areas of the plurality of bounding boxes;

select a predetermined number of bounding boxes from the sorted list, the predetermined number of bounding boxes having a greater area than non-selected boxes of the sorted list; and identify the threshold area as the weighted average based on the area and the weight of the predetermined number of bounding boxes.

20. A non-transitory computer-recording medium having recorded thereon a program which, when executed by a computer, causes the computer to perform the method of claim 1.

* * * * *